United States Patent
Ohno et al.

(10) Patent No.: US 8,083,826 B2
(45) Date of Patent: *Dec. 27, 2011

(54) HONEYCOMB FILTER AND METHOD FOR PRODUCING THE HONEYCOMB FILTER

(75) Inventors: Kazushige Ohno, Gifu (JP); Koji Shimato, Gifu (JP); Masahiro Tsuji, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,419

(22) Filed: Dec. 3, 2010

(65) Prior Publication Data

US 2011/0070129 A1    Mar. 24, 2011

Related U.S. Application Data

(63) Continuation of application No. 12/770,658, filed on Apr. 29, 2010, which is a continuation of application No. 12/032,255, filed on Feb. 15, 2008, now abandoned, which is a continuation of application No. 11/230,844, filed on Sep. 21, 2005, now Pat. No. 7,427,309, which is a continuation of application No. 10/671,418, filed on Sep. 26, 2003, now Pat. No. 7,112,233, which is a continuation of application No. 09/856,751, filed as application No. PCT/JP00/06599 on Sep. 26, 2000, now Pat. No. 6,669,751.

(30) Foreign Application Priority Data

| Sep. 29, 1999 | (JP) | 11-277119 |
| Sep. 29, 1999 | (JP) | 11-277122 |
| Sep. 29, 1999 | (JP) | 11-277123 |
| Sep. 29, 1999 | (JP) | 11-277432 |
| Sep. 30, 1999 | (JP) | 11-278405 |
| Sep. 30, 1999 | (JP) | 11-279866 |

(51) Int. Cl.
*B01D 39/20* (2006.01)
*B01D 46/24* (2006.01)
*F01N 3/022* (2006.01)

(52) U.S. Cl. ............. 55/523; 55/385.3; 55/483; 55/502; 55/524; 55/529; 55/DIG. 5; 55/DIG. 30; 264/628; 264/630; 264/DIG. 48; 60/311; 422/180

(58) Field of Classification Search .............. 428/327, 428/116, 117, 118, 119, 188, 690, 913; 502/493; 156/89; 264/628, 630, 631, DIG. 48; 60/311; 422/180; 55/282.2, 282.3, 385.3, 483, 502, 55/523, 524, 529, DIG. 5, DIG. 30

See application file for complete search history.

(56) References Cited

U.S. PATENT DOCUMENTS 3,950,175 A    4/1976    Lachman et al.
(Continued)

FOREIGN PATENT DOCUMENTS

EP    0036321    9/1981
(Continued)

OTHER PUBLICATIONS

Konstandopoulos et al., "Wall-Flow Diesel Particulate Filters-Their Pressure Drop and Collection Efficiency", SAE 890405, pp. 99-121.

(Continued)

*Primary Examiner* — Jason M Greene
(74) *Attorney, Agent, or Firm* — Ditthavong Mori & Steiner, P.C.

(57) ABSTRACT

A honeycomb filter includes cell walls and cells. The cell walls extend along a longitudinal direction of the honeycomb filter to define the cells between the cell walls. The cells have first cells and second cells each having a substantially square shape in a cross-section perpendicular to the longitudinal direction. The first cells are sealed and the second cells are open at one end face of the honeycomb filter. The substantially square shape of the first cells includes a first side whose extended line intersects a second side except for corner portions of the substantially square shape of the second cells. The second side and the extended line of the first side are substantially perpendicular.

23 Claims, 19 Drawing Sheets

U.S. PATENT DOCUMENTS

| | | | |
|---|---|---|---|
| 4,304,585 A | 12/1981 | Oda et al. |
| 4,329,162 A | 5/1982 | Pitcher |
| 4,381,815 A | 5/1983 | Frost et al. |
| 4,416,675 A | 11/1983 | Montierth |
| 4,416,676 A | 11/1983 | Montierth |
| 4,417,908 A | 11/1983 | Pitcher |
| 4,419,108 A | 12/1983 | Frost et al. |
| 4,420,316 A | 12/1983 | Frost et al. |
| 4,427,272 A | 1/1984 | Gernet |
| 4,428,758 A | 1/1984 | Montierth |
| 4,494,375 A | 1/1985 | Rao et al. |
| 4,522,792 A | 6/1985 | Brennan |
| 4,595,662 A | 6/1986 | Mochida et al. |
| 4,598,054 A | 7/1986 | Mochida et al. |
| 4,632,683 A | 12/1986 | Fukutani et al. |
| 4,643,749 A | 2/1987 | Miura |
| 4,772,508 A | 9/1988 | Brassell |
| 4,777,152 A | 10/1988 | Tsukada |
| 4,849,399 A | 7/1989 | Joy et al. |
| 4,953,627 A | 9/1990 | Ito et al. |
| 5,032,550 A | 7/1991 | Derkacy |
| 5,098,455 A | 3/1992 | Doty et al. |
| 5,260,035 A | 11/1993 | Lachman et al. |
| 5,474,587 A | 12/1995 | Dias et al. |
| 5,549,725 A | 8/1996 | Kasai et al. |
| 5,629,067 A | 5/1997 | Kotani et al. |
| 5,750,026 A | 5/1998 | Gadkaree et al. |
| 5,853,444 A | 12/1998 | Maier et al. |
| 5,914,187 A | 6/1999 | Naruse et al. |
| 5,952,079 A | 9/1999 | Andou et al. |
| 6,101,793 A * | 8/2000 | Nagai et al. ............. 55/523 |
| 6,126,833 A | 10/2000 | Stobbe et al. |
| 6,457,602 B2 | 10/2002 | Uchiyama |
| 6,669,751 B1 | 12/2003 | Ohno et al. |
| 7,112,233 B2 | 9/2006 | Ohno et al. |
| 7,284,980 B2 | 10/2007 | Saijo et al. |
| 7,309,370 B2 | 12/2007 | Kudo et al. |
| 7,332,014 B2 | 2/2008 | Ono et al. |
| 7,341,614 B2 | 3/2008 | Hayashi et al. |
| 7,348,049 B2 | 3/2008 | Yoshida |
| 7,387,829 B2 | 6/2008 | Ohno et al. |
| 7,393,376 B2 | 7/2008 | Taoka et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0154021 A1 | 7/2006 | Ohno et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0032370 A1 | 2/2007 | Weisensel et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi et al. |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saijo et al. |
| 2008/0251977 A1 | 10/2008 | Naruse et al. |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 0283224 | 9/1988 |
| EP | 0308972 | 3/1989 |
| EP | 0336883 | 10/1989 |
| EP | 0449556 | 10/1991 |
| EP | 0501733 | 9/1992 |
| EP | 0554104 | 8/1993 |
| EP | 0658363 | 6/1995 |
| EP | 0753490 | 1/1997 |
| EP | 0 816 065 A1 * | 1/1998 |
| EP | 0816065 | 1/1998 |
| EP | 0990777 | 4/2000 |
| EP | 1491248 | 12/2004 |
| EP | 1508355 | 2/2005 |
| JP | 60-255671 | 12/1985 |
| JP | 61-91076 | 5/1986 |
| JP | 1-145378 | 6/1989 |
| JP | 2-255581 | 10/1990 |
| JP | 04-187578 | 7/1992 |
| JP | 05-023512 | 2/1993 |

| JP | 05-139861 | 6/1993 |
| JP | 05-184833 | 7/1993 |
| JP | 06-146849 | 5/1994 |
| JP | 06-047620 | 6/1994 |
| JP | 06-182228 | 7/1994 |
| JP | 07-054643 | 2/1995 |
| JP | 7-328360 | 12/1995 |
| JP | 8-28246 | 1/1996 |
| JP | 8-217565 | 8/1996 |
| JP | 8-281036 | 10/1996 |
| JP | 08-323123 | 12/1996 |
| JP | 09-155131 | 6/1997 |
| JP | 10-099625 | 4/1998 |
| JP | 2001-079321 | 3/2001 |
| WO | WO 93/13303 | 7/1993 |
| WO | WO 94/21900 | 9/1994 |
| WO | WO 94/22556 | 10/1994 |
| WO | WO 03/024892 | 3/2003 |
| WO | WO 2006/051890 | 5/2006 |

OTHER PUBLICATIONS

Hiroshige Mizuno et al., "Effect of Cell Structure on Regeneration Failure of Ceramic Honeycomb Diesel Particulate Filter", SAE Technical Paper Series 870010, pp. 9, 12-15.
Summary of method for specific surface area by BET.
Austin et al., "Carbide, Nitride and Boride Materials Synthesis and Processing", 1997, pp. 18, 460-477, Chapman & Hall, London, UK.
R. Morrell., "Handbook of Properties of Technical & Engineering Ceramics", 1985, pp. 44-49, 154-155, and 216-223, Her Majesty's Stationery Office, London.
Statement from "Washington Mills", Oct. 20, 2009.
W.F. Knippenberg., "Growth Phenomena in Silicon Carbide", Philips Research Reports, 1963, pp. 160-274, vol. 18 No. 3.
Jena et al. "Characterization of Pore Structure of Filter Media", Fluid/Particle Separation Journal, vol. 14, No. 3, p. 227-241, 2002.
Reed, Principles of Ceramics Processing, $2_{nd}$ ED, pp. 123-125, 1995.
Japanese Office Action for corresponding JP Application No. 2008-206581, Sep. 14, 2010.
J.S. Howitt, "Thin Wall Ceramics as Monolithic Catalyst Supports", SAE Technical Paper Series 800082, pp. 1-9, 1980.
J.S. Howitt et al., "Cellular Ceramic Diesel Particulate Filter", SAE Technical Paper Series 810114, pp. 1-9, 1981.
Suresh T. Gulati, "Strength and Thermal Shock Resistance of Segmented Wall-Flow Diesel Filters", SAE Technical Paper Series 860008, pp. 11-18.
Osamu Shinozaki et al., "Trapping Performance of Diesel Particulate Filters", SAE Technical Paper Series 900107, pp. 1-5, 1990.
Jun Kitagawa et al., "Improvement of Pore Size Distribution of Wall Flow Type Diesel Particulate Filter", SAE Technical Paper Series 920144, pp. 184-190, 1992.
Atsushi Itoh et al., "Study of SiC Application to Diesel Particulate Filter (Part 1): Material Development", SAE Technical Paper Series 930360, pp. 111-119, 1993.
Hiroshi Okazoe et al., "Study of SiC Application to Diesel Particulate Filter (Part 2): Engine Test Results", SAE Technical Paper Series 930361, pp. 121-128, 1993.
Per Stobbe et al., "SiC as a Substrate for Diesel Particulate Filters", SAE Technical Paper Series 932495, pp. 1-15, 1993.
EP1142619, New Opposition, Oct. 24, 2007.
EP1142619, Reply to Opposition, Jun. 2, 2008.
EP1142619, Written Submission, Sep. 2, 2010.
EP1142619, Written Submission, Sep. 24, 2010.
EP1142619, Written Submission, Sep. 27, 2010.
EP1142619, Written Submission, Sep. 29, 2010.
EP1142619, Grounds of Decision, Nov. 9, 2011.
EP1508355, New Opposition, Oct. 8, 2007.
EP1508355, Reply to Opposition, May 13, 2008.
EP1508355, Written Submission, Sep. 3, 2010.
EP1508355, Written Submission, Sep. 6, 2010.
EP1508355, Written Submission, Sep. 24, 2010.
EP1508355, Grounds of Decision, Nov. 19, 2011.
EP1508355, Grounds of Appeal, Mar. 21, 2011.
EP1516659, New Opposition, Sep. 10, 2007.
EP1516659, New Opposition, Sep. 12, 2007.
EP1516659, Reply to Opposition, Apr. 17, 2008.
EP1516659, Written Submission, Sep. 6, 2010.
EP1516659, Written Submission, Sep. 7, 2010.
EP1516659, Written Submission, Sep. 24, 2010.
EP1516659, Grounds of Decision, Nov. 29, 2010.
EP1516659, Grounds of Appeal, Apr. 11, 2011.
EP1508356, New Opposition, Sep. 10, 2007.
EP1508356, New Opposition, Sep. 12, 2007.
EP1508356, Reply to Opposition, Apr. 17, 2008.
EP1508356, Written Submission, Sep. 8, 2010.
EP1508356, Written Submission, Sep. 10, 2010.
EP1508356, Written Submission, Sep. 28, 2010.
EP1508356, Written Submission, Oct. 1, 2010.
EP1508356, Grounds of Decision, Nov. 29, 2010.
EP1508356, Grounds of Appeal, Apr. 11, 2011.
EP1508358, New Opposition, Jan. 14, 2010.
EP1508358, Reply to Opposition, Sep. 1, 2010.
EP1508357, New Opposition, Dec. 13, 2007.
EP1508357, New Opposition, Dec. 14, 2007.
EP1508357, Reply to Opposition, Jul. 21, 2008.
EP1508357, Written Submission, Jan. 14, 2009.
EP1508357, Written Submission, Sep. 10, 2010.
EP1508357, Written Submission, Sep. 15, 2010.
EP1508357, Written Submission, Sep. 17, 2010.
EP1508357, Written Submission, Sep. 28, 2010.
EP1508357, Written Submission, Sep. 30, 2010.
EP1508357, Grounds of Decision, Dec. 3, 2010.
EP1508357, Grounds of Appeal, Apr. 26, 2011.
EP1688171, New Opposition, Nov. 11, 2010.
EP1688171, New Opposition, Nov. 16, 2010.
EP1666121, New Opposition, Oct. 20, 2009.
EP1666121, Reply to Opposition, Jun. 8, 2010.
EP1666121, Written Submission, Nov. 12, 2010.
EP1666121, Written Submission, Dec. 9, 2010.
EP1666121, Written Submission, Dec. 22, 2010.
EP1666121, Written Submission, Jan. 7, 2011.
EP1666121, Grounds of Decision, Feb. 3, 2011.
Documents submitted in EP1508355, Reply to Appeal, Dated Aug. 4, 2011.*
Documents submitted in EP1516659, Reply to Appeal, Dated Jul. 1, 2011.*
Documents submitted in EP1508356, Reply to Appeal, Dated Aug. 18, 2011.*
Documents submitted in EP1508357, Reply to Appeal, Dated Jul. 7, 2011.*
Documents submitted in EP1688171, Reply to Opposition, Dated Jul. 1, 2011.*
Documents submitted in EP1666121, Grounds of Appeal (D25), Dated Jun. 14, 2011.*
Documents submitted in EP1666121, Reply to Appeal, Dated Oct. 10, 2011.

* cited by examiner

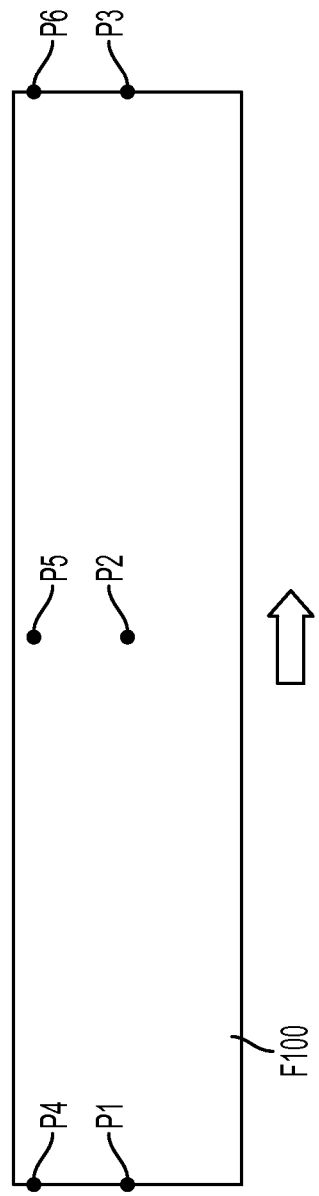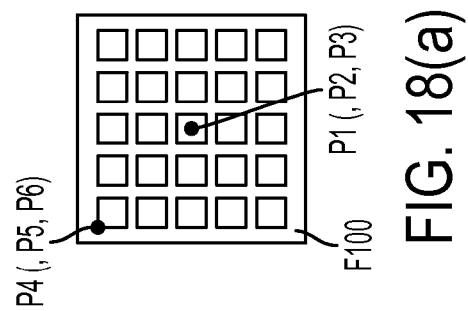

HONEYCOMB FILTER AND METHOD FOR PRODUCING THE HONEYCOMB FILTER

CROSS-REFERENCE TO RELATED APPLICATIONS

This application is a continuation application of Ser. No. 12/770,658 filed Apr. 29, 2010, which in turn is a continuation application of Ser. No. 12/032,255 filed Feb. 15, 2008, which in turn is a continuation application of Ser. No. 11/230,844 filed Sep. 21, 2005, which in turn is a continuation application of Ser. No. 10/671,418 filed Sep. 26, 2003, which is now Pat. No. 7,112,233, patented Sep. 26, 2006; which in turn is a continuation application of Ser. No. 09/856,751 filed Jul. 30, 2001, which is now Pat. No. 6,669,751, patented Dec. 30, 2003; which in turn is the U.S. National application of PCT application PCT/JP00/06599 filed Sep. 26, 2000. The contents of these applications and patents are incorporated herein by reference in their entirety.

BACKGROUND OF THE INVENTION

1. Field of the Invention

The present invention relates to a honeycomb filter and a method for producing a honeycomb filter.

2. Discussion of the Background

The number of automobiles has increased drastically this century. As a result, the amount of gas discharged from automobile engines has continued to increase proportionally. Various substances suspended in the exhaust gas that is emitted, especially from diesel engines, cause pollution and severely affect the environment. Further, recently reported research results have shown that the fine particles suspended in gas emissions (diesel particulates) may cause allergies or decrease sperm counts. Thus, actions to eliminate the fine particles suspended in gas emissions must immediately be taken for the sake of mankind.

Due to this situation, many exhaust gas purification apparatuses have been proposed in the prior art. A typical exhaust gas purification apparatus includes a casing, which is located in an exhaust pipe connected to an exhaust manifold of an engine, and a filter, which is arranged in the casing and has fine pores. In addition to a metal or an alloy, the filter may be formed from ceramic. A cordierite honeycomb filter is a known example of a ceramic filter. Recent filters are often formed from sintered porous silicon carbide body that is advantageous from the viewpoints of heat resistance and mechanical strength, has a high accumulating efficiency, is chemically stable, and has a small pressure loss.

The pressure loss refers to the difference between the pressure value taken upstream of the filter and the pressure value taken downstream of the filter. A main cause of power loss is the resistance the exhaust gas encounters when passing through a filter.

The honeycomb filter includes a plurality of cells extending along the axial direction of the honeycomb filter. When the exhaust gas passes through the filter, the walls of the cells trap fine particles. This removes fine particles from the exhaust gas.

However, the honeycomb filter, which is made of a sintered porous silicon carbide body, is vulnerable to thermal impacts. Thus, larger filters are liable to crack. Accordingly, a technique for manufacturing a large ceramic filter assembly by integrating a plurality of small filters has recently been proposed to prevent breakage resulting from cracks.

A typical method for manufacturing a ceramic filter assembly will now be discussed. First, ceramic raw material is continuously extruded from a mold of an extruder to form an elongated square honeycomb molded product. After the honeycomb filter is cut into pieces of equal length, the cut pieces are sintered to form a filter. Subsequent to the sintering process, a plurality of the filters are bundled and integrated by adhering the outer surfaces of the filters to each other with a ceramic seal layer having a thickness of 4 to 5 mm. This completes the desired ceramic filter assembly.

A mat-like thermal insulative material, made of ceramic fiber or the like, is wrapped about the outer surface of the ceramic filter assembly. In this state, the assembly is arranged in a casing, which is located in an exhaust pipe.

However, in the prior art, there is a shortcoming in that the fine particles trapped in the ceramic filter assembly do not burn completely and some of the fine particles remain unburned. Accordingly, the efficiency for processing the exhaust gas is low.

Further, the honeycomb filter of the prior art has corners. Thus, there is a tendency of stress concentrating on the corners of the outer surface and chipping the corners. Further, the seal layer may crack and break the ceramic filter assembly from the corners thereby damaging the entire ceramic filter assembly. Even if the assembly does not break, there is a shortcoming in that leakage of the exhaust gas may decrease the processing efficiency.

During usage of the filter assembly, a high temperature difference between the honeycomb filters may cause thermal stress to crack the honeycomb filters and break the entire assembly. Thus, the strength of each honeycomb filter must be increased to increase the strength of the honeycomb filter assembly.

The prior art ceramic filter assembly as a whole has a rectangular cross-section. Thus, the periphery of the assembly is cut so that the assembly as a whole has a generally round or oval cross-section.

However, the filter has a plurality of cells. Thus, if the periphery of the assembly is cut, the cell walls are exposed from the peripheral surface subsequent to the cutting. This forms lands and pits on the peripheral surface. Thus, even if the assembly is accommodated in the casing with the thermal insulative material attached to the peripheral surface of the assembly, gaps are formed in the longitudinal direction of the filters. Thus, exhaust gas tends to leak through the gaps. This lowers the processing efficiency of the exhaust gas.

With regard to diesel particulates trapped in the honeycomb filter, it has been confirmed that particulates having a small diameter have a high lung attaching rate and increase the risk to health. Thus, there is great need to trap small particulates.

However, when the pore diameter and the porosity of the honeycomb filter are small, the honeycomb filter becomes too dense and hinders smooth passage of the exhaust gas, which, in turn, increases the pressure loss. This lowers the driving performance of the vehicle, lowers fuel efficiency, and deteriorates the driving performance.

On the other hand, if the pore diameter and porosity rate are increased, the above problems are solved. However, the number of openings in the honeycomb filter becomes too large. Thus, fine particles cannot be trapped. This decreases the trapping efficiency. Further, the mechanical strength of the honeycomb filter becomes low.

SUMMARY OF THE INVENTION

According to one aspect of the present invention, a honeycomb filter includes cell walls and cells. The cell walls extend along a longitudinal direction of the honeycomb filter to define the cells between the cell walls. The cells have first cells and second cells each having a substantially square shape in a cross-section perpendicular to the longitudinal direction. The first cells are sealed and the second cells are open at one end face of the honeycomb filter. The substantially square shape of the first cells includes a first side whose extended line intersects a second side except for corner portions of the substantially square shape of the second cells. The second side and the extended line of the first side are substantially perpendicular.

According to another aspect of the present invention, a method for producing a honeycomb filter includes providing a ceramic raw material slurry. The ceramic raw material slurry is provided into an extruder to obtain a molded honeycomb filter. The molded honeycomb filter includes cell walls and cells. The cell walls extend along a longitudinal direction of the honeycomb filter to define the cells between the cell walls. The cells have first cells and second cells each having a substantially square shape in a cross-section perpendicular to the longitudinal direction. The first cells are sealed and the second cells are open at one end face of the honeycomb filter. The substantially square shape of the first cells includes a first side whose extended line intersects a second side except for corner portions of the substantially square shape of the second cells. The second side and the extended line of the first side are substantially perpendicular. The molded honeycomb filter is sintered.

According to further aspect of the present invention, a method for producing a honeycomb filter includes mixing ceramic particles and a binder to obtain a ceramic raw material slurry. The ceramic raw material slurry is provided into an extruder to obtain a molded honeycomb filter. The molded honeycomb filter includes cell walls. The cell walls extend along a longitudinal direction of the molded honeycomb filter to define cells having a substantially square shape. The molded honeycomb filter is dried using a microwave dryer. A sealing paste is provided in at least one of the cells at one end face of the honeycomb filter to seal the at least one of the cells at the one end face. The sealing paste is dried using a microwave dryer. The dried molded honeycomb filter is sintered.

BRIEF DESCRIPTION OF THE DRAWINGS

FIG. 18(a) is a schematic cross-sectional view showing the filter of FIG. 17, and FIG. 18(b) is a schematic side view showing the filter of FIG. 17.

DESCRIPTION OF THE EMBODIMENTS

A diesel engine exhaust gas purification apparatus 1 according to a first embodiment of the present invention will now be described with reference to FIGS. 1 to 5.

Figure 1:
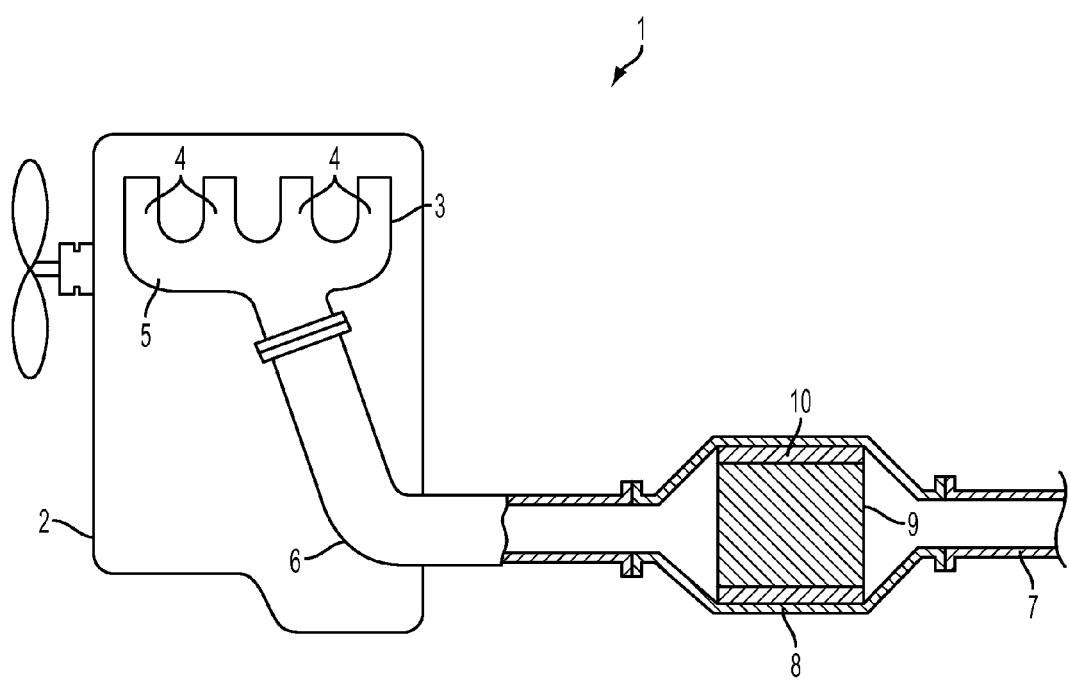
FIG. 1 is a schematic view showing an exhaust gas purification apparatus according to a first embodiment of the present invention.

Referring to FIG. 1, the exhaust gas purification apparatus 1 is an apparatus for purifying the exhaust gas emitted from a diesel engine 2, which serves an internal combustion engine. The diesel engine 2 has a plurality of cylinders (not shown). Each cylinder is connected to a branch 4 of an exhaust manifold 3, which is made of a metal material. Each branch 4 is connected to a single manifold body 5. Accordingly, the exhaust gas emitted from each cylinder is concentrated at one location.

A first exhaust pipe 6 and a second exhaust pipe 7, which are made of a metal material, are arranged downstream to the exhaust manifold 3. The upstream end of the first exhaust pipe 6 is connected to the manifold body 5. A tubular casing 8 made of a metal material is arranged between the first exhaust pipe 6 and the second exhaust pipe 7. The upstream end of the casing 8 is connected to the downstream end of the first exhaust pipe 6, and the downstream end of the casing 8 is connected to the upstream end of the second exhaust pipe 7. With this structure, it may be considered that the casing 8 is arranged in the exhaust pipes 6, 7. The first exhaust pipe 6, the casing 8, and the second exhaust pipe 7 are communicated with each other so that exhaust gas flows therethrough.

As shown in FIG. 1, the middle portion of the casing 8 has a diameter larger than that of the exhaust pipes 6, 7. Accordingly, the interior of the casing 8 is larger than that of the exhaust pipes 6, 7. A ceramic filter assembly 9 is accommodated in the casing 8.

A thermal insulative material 10 is arranged between the outer surface of the assembly 9 and the inner surface of the casing 8. The thermal insulative material 10 is a mat-like material including ceramic fibers and has a thickness of several millimeters to several tens of millimeters. It is preferred that the heat insulative material 10 be thermally expansive. Thermally expansive refers to the release of thermal stress through an elastic structure. This is to minimize energy loss during reproduction by preventing heat from being released from the outermost portion of the assembly 9. Further, the expansion of ceramic fibers using the heat produced during reproduction prevents displacement of the ceramic filter assembly 9, which would result from the pressure of the exhaust gas or vibrations produced by the moving vehicle.

Figure 2:
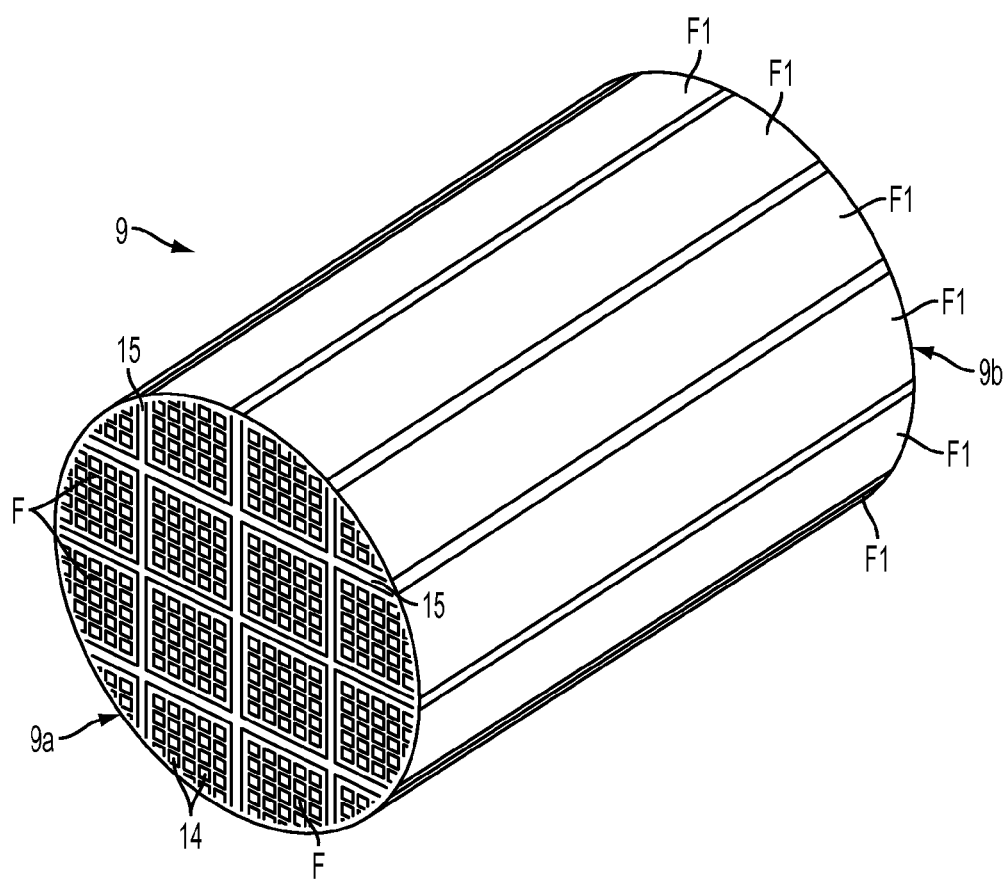
FIG. 2 is a perspective view showing a ceramic filter assembly of the exhaust gas purification apparatus of FIG. 1.

The ceramic filter assembly 9 eliminates diesel particulates and it thus normally referred to as a diesel particulate filter (DPF). As shown in FIG. 2 and FIG. 4, the assembly 9 is formed by bundling and integrating a plurality of filters F. Elongated square filters F1 are arranged at the central portion of the assembly 9, and the outer dimension of the elongated square filter F1 is 33 mm×33 mm×167 mm (refer to FIG. 3). Filters F1 that have forms differing from the elongated square filters F1 are arranged about the elongated square filters F1. This forms the ceramic filter body 9, which as a whole, is cylindrical (diameter being about 135 mm).

These filters F1 are made of a sintered porous silicon carbide, which is one type of sintered ceramic. The reason for employing sintered porous silicon carbide is because it is advantageous especially in that it has superior heat resistance and heat conductance. In addition to sintered porous silicon carbide, the sintered material may be silicon nitride, sialon, alumina, cordierite, or mullite.

Figure 3:
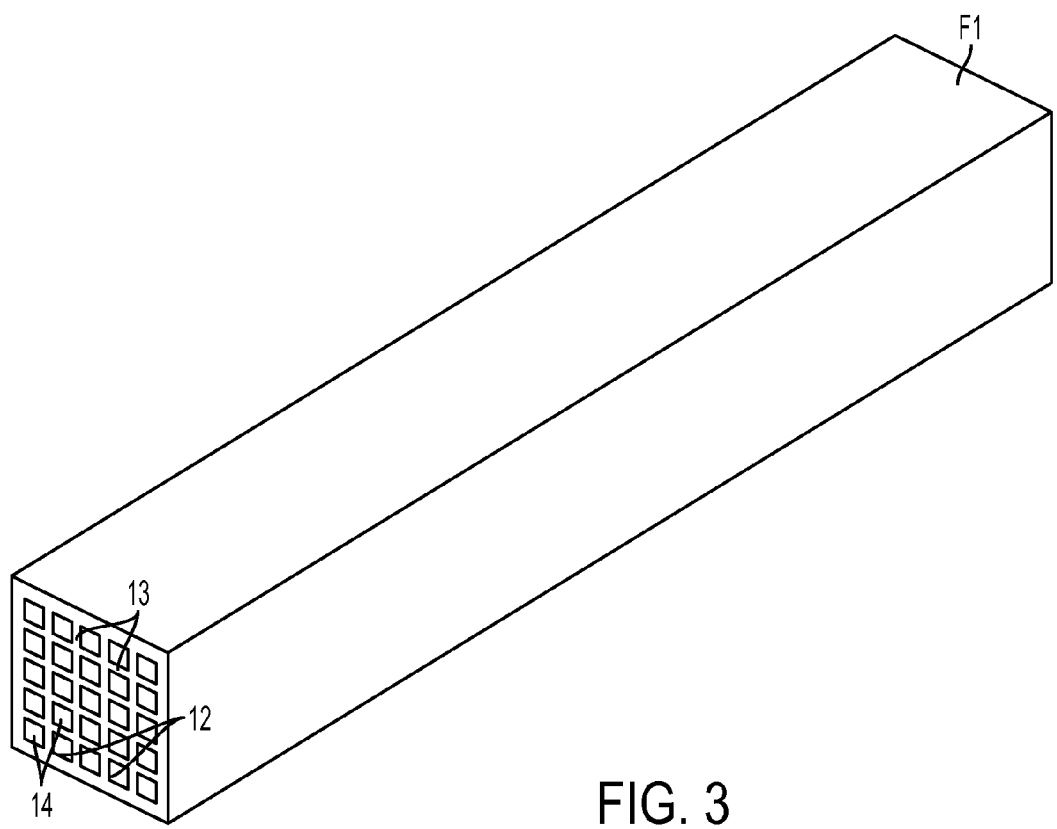
FIG. 3 is a perspective view showing a honeycomb filter of the ceramic filter assembly of FIG. 2.
Figure 4:
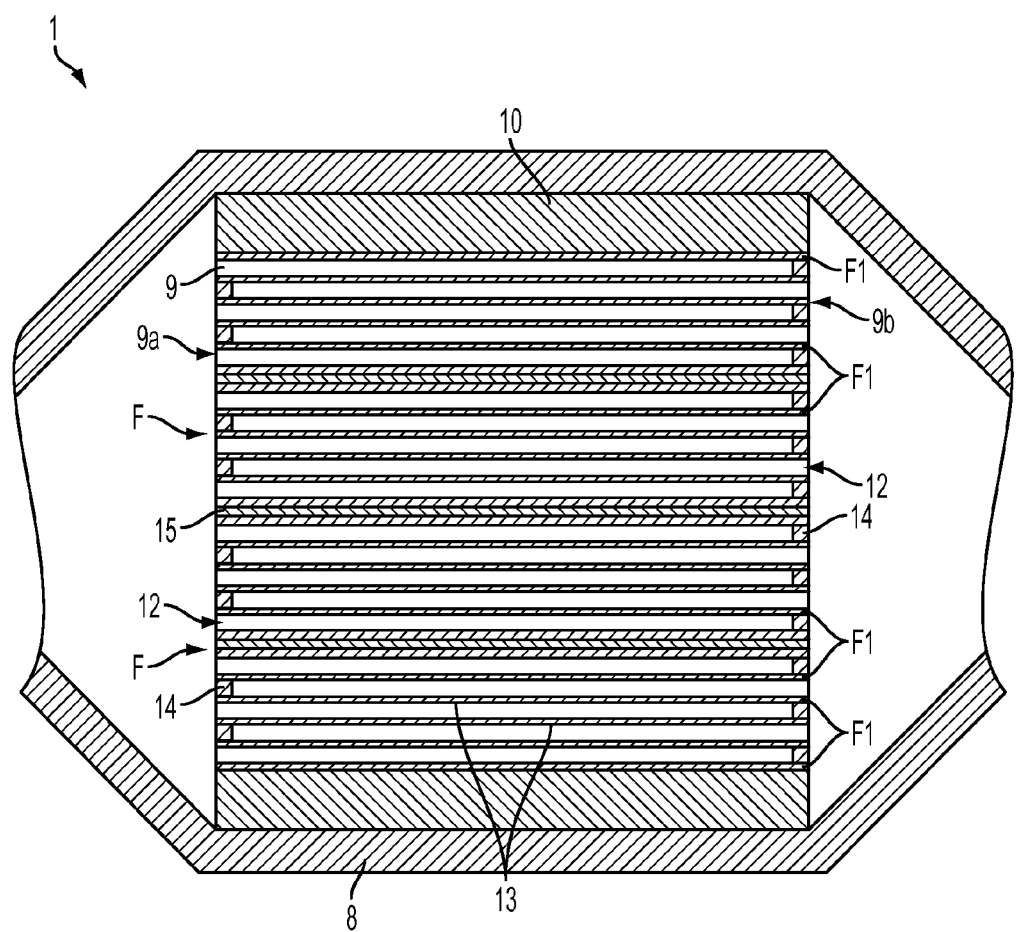
FIG. 4 is an enlarged cross-sectional view showing the main portion of the exhaust gas purification apparatus of FIG. 1.

As shown in FIG. 3 and the other drawings, the filters F1 have a honeycomb structure. The reason for employing the honeycomb structure is in that the pressure loss is small when the trapped amount of fine particles increases. Each filter f1 has a plurality of through holes 12, which have generally square cross-sections and are arranged regularly extending in the axial direction. The through holes 12 are partitioned from each other by thin cell walls 13. The outer surface of the cell wall 13 carries an oxide catalyst formed from a platinum group element (such as Pt) or other metal elements and there oxides. The opening of each through hole 12 on one of the end surfaces 9a, 9b is sealed by a sealing body 14 (sintered porous silicon carbide body). Accordingly, the end surfaces 9a, 9b have a chessboard appearance. Thus, the filters F1 have a plurality of cells having square cross-sections. The cell density is about 200/inch, the thickness of the cell wall 13 is about 0.3 mm, and the cell pitch is about 1.8 mm. Among the plurality of cells, about half are opened to the upstream end surface 9a, and the others are opened at the downstream end surface 9b.

The average porous diameter of the filter F1 is about 1 µm-50 µm, and more particularly, 5 µm-20 µm. If the average pore diameter is less than 1 µm, the deposited fine particles tend to clog the filter F1. If the average pore diameter exceeds 50 µm, fine particles would not be trapped and would decrease the trapping efficiency.

It is preferred that the porosity rate be 30% to 70%, and more particularly, 40% to 60%. If the porosity rate is lower than 30%, the filter F1 becomes too fine and may hinder the circulation of exhaust gas therein. If the porosity rate exceeds 70%, the amount of gaps in the filters F1 becomes too large. This may decrease the strength of the filters f1 and decrease the fine particle trapping efficiency.

When selecting the sintered porous silicon carbide, it is preferred that the heat conductance of the filter F1 be 20 W/mK to 80 W/mK, and more particularly, 30 W/mK to 70 W/mK.

Figure 5:
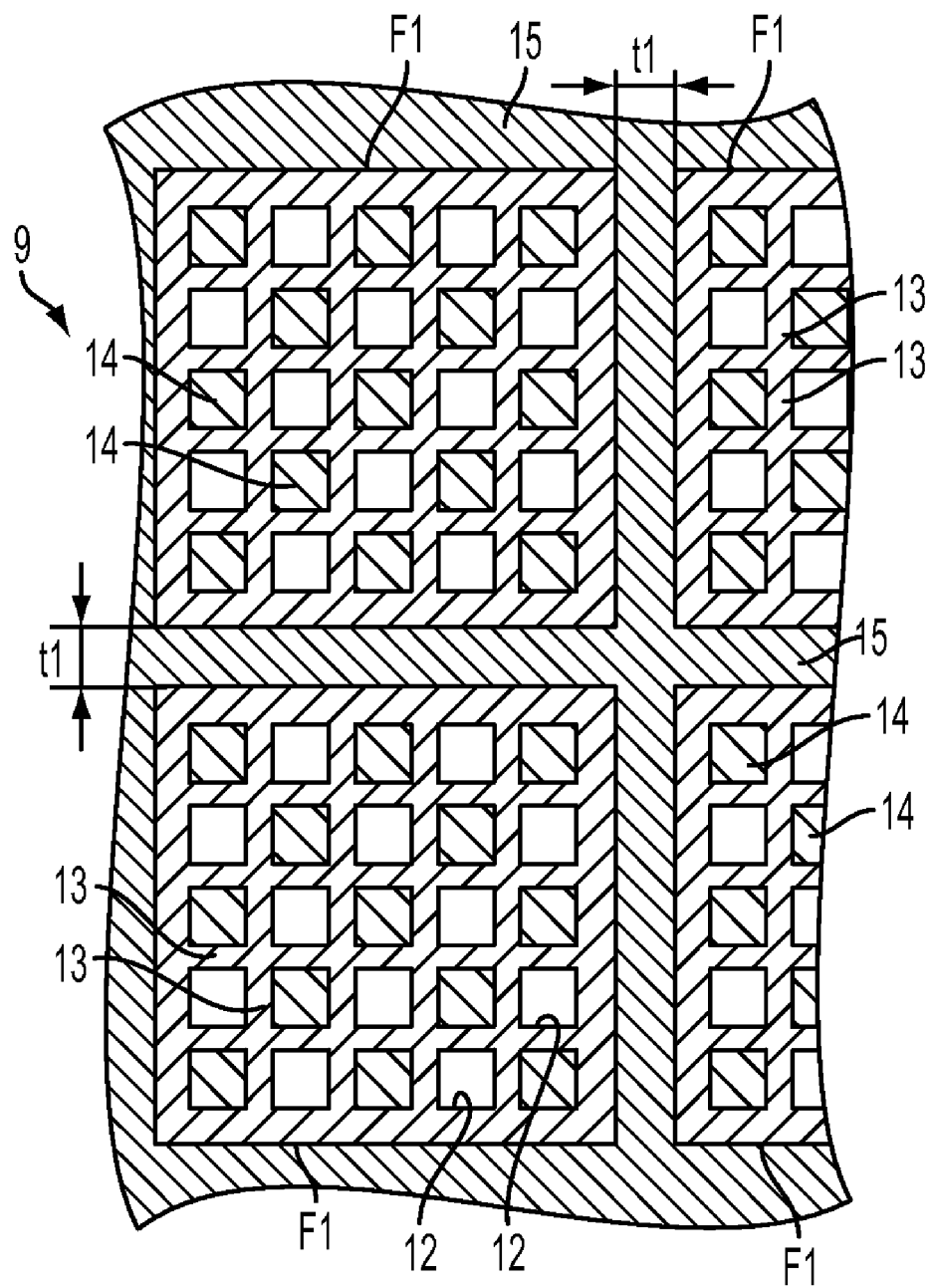
FIG. 5 is an enlarged cross-sectional view showing the main portion of the ceramic filter assembly of FIG. 2.

Referring to FIGS. 4 and 5, the outer surfaces of a total of 16 filters F are adhered to one another by means of a ceramic seal layer 15.

The ceramic seal layer 15 will now be described in detail.

It is preferred that the heat conductance of the seal layer 15 be 0.1 W/mK-10 W/mK, and more particularly be 0.2 W/mK-2 W/mK.

If the heat conductance is less than 0.1 W/mK, the heat conductance of the seal layer 15 cannot be sufficiently improved. Thus, the seal layer 15 continues to be a large resistance and hinders heat conduction between filters F1. On the other hand, if the heat conductance exceeds 10 W/mK, properties such as adhesion and heat resistance may be degraded and cause manufacturing to be difficult.

It is required that the thickness t1 of the seal layer 15 be 0.3 mm-3 mm. Further, it is preferred that the thickness be 0.5 mm-2 mm.

If the thickness t1 exceeds 3 mm, the seal layer 15 continues to be a large seal layer 15 even if the heat conductance is high and the heat conductance between the filters F1 is hindered. In addition, the ratio of the assembly 9 occupied by the filters F1 would relatively decrease and lower the filtration capacity. On the other hand, if the thickness t1 of the seal layer 15 is less than 0.3 mm, the seal layer 15 would not become a large resistance. However, the force adhering the filters F1 to each other may become too low and cause the assembly 9 to be vulnerable to breakage.

The seal layer 15 is formed from at least an inorganic fiber, an inorganic binder, an organic binder, and inorganic particles. Further, it is preferred that the seal layer 15 be an elastic material formed by binding inorganic fibers and inorganic particles, which three-dimensionally intersect one another, with an inorganic binder and an organic binder.

At least one type of ceramic fiber selected from silica-alumina fiber, mullite fiber, alumina fiber, and silica fiber are selected as the inorganic fiber included in the seal layer 15. Among these fibers, it is most preferred that silica-alumina ceramic fiber be selected. Silica-alumina ceramic fiber has superior elasticity and serves to absorb thermal stress.

In this case, the content of the silica-alumina ceramic fiber in the seal layer 15 is 10 wt %-70 wt %, preferably 10 wt %-40 wt %, and more preferably 20 wt %-30 wt %. If the content is less than 10 wt %, the thermal conductivity decreases and the elasticity decreases. If the content exceeds 70%, the thermal conductivity and elasticity decrease.

The shot content of the silica-alumina ceramic fiber is 1 wt %-10 wt %, preferably 1 wt %-5 wt %, and more preferably 1 wt %-3 wt %. If the shot content is less than 1 wt %, manufacture is difficult, and if the shot content is 50 wt %, the outer surface of the filter F1 may be damaged.

The fiber length of silica-alumina ceramic fiber is 1 mm-10 mm, preferably 1 mm-50 mm, and more preferably 1 mm-20 mm. If the fiber length is 1 mm or less, there is a disadvantage in that an elastic structure cannot be formed. If the fiber length exceeds 100 mm, there is a disadvantage in that the fiber may produce balls of fibers and decrease the dispersion of inorganic fine particles. Further, if the fiber length exceeds 100 mm, it becomes difficult to make the seal layer thinner than 3 mm and to improve the heat conductance between the filters F1.

It is preferred that the inorganic binder included in the seal layer 15 be a colloidal sol selected from at least one of silica sol and alumina sol. It is especially preferred that silica sol be selected. This is because silica sol is optimal for use as an adhesive agent under high temperatures since it is easily obtained easily sintered to $SiO_2$. In addition, silica sol has a superior insulative characteristic.

In this case, the content of silica sol in the seal layer 15 as a solid is 1 wt %-30 wt %, preferably 1 wt %-15 wt %, and more preferably 5 wt %-9 wt %. If the content is less than 1 wt %, the adhesive strength decreases. On the other hand, if the content exceeds 30 wt %, the thermal conductivity decreases.

It is preferred that the organic binder included in the seal layer 15 be a hydrophilic organic high polymer and also be preferred that the organic binder be a polysaccharide selected from at least one of poly vinyl alcohol, methyl cellulose, ethyl cellulose, and carboxymethyl cellulose. It is especially preferred that carboxymethyl cellulose be selected. This is because the seal layer 15 has optimal fluidity due to carboxymethyl cellulose and thus has superior adhesion under normal temperatures.

In this case, the content of carboxymethyl cellulose as a solid is 0.1 wt %-5.0 wt %, preferably 0.2 wt %-1.0 wt %, and more preferably 0.4 wt %-0.6 wt %. If the content is less than 0.1 wt %, sufficient inhibition of migration becomes difficult. Migration refers to a phenomenon in which the binder in the seal layer 15 moves as the solvent is removed as it dries when the seal layer 15 charged between the sealed bodies hardens. If the content exceeds 5.0 wt %, high temperature burns and eliminates the organic binder and decreases the strength of the seal layer 15.

It is preferred that the inorganic particles included in the seal layer 15 be an inorganic powder or an elastic material employing a whisker that is selected from at least one of silicon carbide, silicon nitride, and boron nitride. Such carbide and nitrides have an extremely high thermal conductivity and, when included in the surface of a ceramic fiber or in the surface of inside a colloidal sol, contributes to increasing the thermal conductivity.

Among the above carbide and nitrides, it is especially preferred that the silicon carbide powder be selected. This is because the thermal conductivity of silicon carbide is extremely high and easily adapts to ceramic fiber. In addition, in the first embodiment, the filter F1, which is the sealed body, is made of sintered porous silicon carbide. Thus, it is preferred that the same type of silicon carbide powder be selected.

In this case, it is preferred that the content of the silicon carbide powder as a solid be 3 wt %-80 wt %, preferably 10 wt %-60 wt %, and more particularly, 20 wt %-40 wt %. If the content is 3 wt % or less, the thermal conductivity of the seal layer 15 decreases and results in the seal layer 15 having a large heat resistance. If the content exceeds 80 wt %, the adhesion strength decreases when the temperature is high.

The grain diameter is 0.01 μm-100 μm, preferably 0.1 μm-15 μm, and more preferably 0.1 μm-10 μm. If the grain diameter exceeds 100 μm, the adhesion and thermal conductivity decrease. If the grain diameter is less than 0.01 μm, the cost of the seal material 15 increases.

The procedure for manufacturing the ceramic filter assembly 9 will now be discussed.

First, a ceramic raw material slurry used during an extrusion process, a sealing paste used during an end surface sealing process, and a seal layer formation paste used during a filter adhesion process are prepared.

The ceramic raw material slurry is prepared by combining and kneading predetermined amounts of an organic binder and water with silicon carbide particles. The sealing paste is prepared by combining and kneading an organic binder, a lubricative agent, a plastic agent, and water with silicon carbide powder. The seal layer formation paste is prepared by combining and kneading predetermined amounts of an inorganic fiber, an inorganic binder, an organic binder, and inorganic particles, and water.

Next, the ceramic raw material slurry is put into an extruder and continuously extruded from a mold. Afterward, the extruded honeycomb molded product is cut into equivalent lengths to obtain elongated square honeycomb molded product pieces. Further, a predetermined amount of sealing paste is charged into one of the openings of each cell in the cut pieces such that both end surfaces of each cut piece is sealed.

Then, main sintering is performed by setting predetermined conditions, such as the temperature and time, to completely sinter the honeycomb molded pieces and the sealing bodies 14. All of the sintered porous silicon carbide filters F1 obtained in this manner are still square pole-shaped.

The sintering temperature is set to 2,100° C. to 2,300° C. in the present embodiment to obtain the average pore diameter of 6 μm-15 μm and a porosity of 35% to 50%. Further, the sintering time is set to 0.1 hours to 5 hours. Further, the interior of a furnace has an inert atmosphere during sintering, and the pressure in that atmosphere is the normal pressure.

Then, after forming a ceramic bedding layer to the outer surface of the filters F1 as required, the seal layer formation paste is applied thereto. The outer surfaces of sixteen of such filters F1 are adhered to each other and thus integrated.

In the following outer form cutting process, the assembly 9, which has been obtained through the filter adherence process and has a square cross-section, is ground to form the outer shape of the assembly 9 by eliminating unnecessary sections from the peripheral portion of the assembly 9 and form the ceramic filter assembly 9, which cross-section is round.

The fine particle trapping performed by the ceramic filter assembly 9 will now be described briefly.

The ceramic filter assembly 9 accommodated in the casing 9a is supplied with exhaust gas. The exhaust gas supplied via the first exhaust pipe 6 first enters the cells that are opened at the upstream end surface 9a. The exhaust gas than passes through the cell wall 13 and enters the adjacent cells, or the cells that are opened at the downstream end surface 9b. From the openings of these cells, the exhaust gas flows out of the downstream end surfaces 9b of the filters F1. However, the fine particles included in the exhaust gas do not pass through the cell walls 13 and are trapped by the cell walls 13. As a result, the purified gas is discharged from the downstream end surface 9b of the filters F1. The purified exhaust gas then passes through the second exhaust pipe 7 to be ultimately discharged into the atmosphere. The trapped fine particles are ignited and burned by the catalytic effect that occurs when the internal temperature of the assembly 9 reaches a predetermined temperature.

Example 1-1

(1) 51.5 wt % of a silicon carbide powder having an average grain diameter of 10 μm and 22 wt % of a silicon carbide powder having an average grain diameter of 0.5 μm were wet-mixed. Then, 6.5 wt % of the organic binder (methyl cellulose) and 20 wt % of water were added to the obtained mixture and kneaded. Next, a small amount of the plastic agent and the lubricative agent were added to the kneaded mixture, further kneaded, and extruded to obtain the honeycomb molded product. More specifically, the a silicon carbide powder having an average particle diameter of about 10 μm was produced by Yakushima Denkou Kabushiki Kaisha under the product name of C-1000F, and the α silicon carbide powder having an average particle diameter of about 0.5 μm was produced by Yakushima Denkou Kabushiki Kaisha under the product name of GC-15.

(2) Then, after drying the molded product with a microwave dryer, the through holes 12 of the molded product was sealed by the sealing paste made of sintered porous silicon carbide. Afterward, the sealing paste was dried again with the dryer. After the end surface sealing process, the dried body was degreased at 400° C. and then sintered for about three hours at 2,200° C. in an argon atmosphere at the normal pressure. This obtained the porous, honeycomb, silicon carbide filters F1.

(3) 23.3 wt % of a ceramic fiber (alumina silicate ceramic fiber, shot content 3%, fiber length 0.1 mm-100 mm), 30.2 wt % of silicon carbide having an average grain diameter of 0.3 μm, 7 wt % of silica sol (the converted amount of $SiO_2$ of the sol being 30%) serving as the inorganic binder, 0.5 wt % of carboxymethyl cellulose serving as the organic binder, and 39 wt % of water were mixed and kneaded. The kneaded material was adjusted to an appropriate viscosity to prepare the paste used to form the seal layer 15.

(4) Then, the seal layer forming paste was uniformly applied to the outer surface of the filters F1. Further, in a state in which the outer surfaces of the filters F1 were adhered to one another, the filters F1 were dried and hardened under the condition of 50° C. to 100° C.×1 hour. As a result, the seal layer 15 adhered the filters F1 to one another. The thickness t1 of the seal layer 15 was set at 0.5 mm. The heat conductivity of the seal layer 15 was 0.3 W/mK.

(5) Next, the peripheral portion was cut to shape the peripheral portion and complete the ceramic filter assembly 9, which has a round cross-section.

Then, the thermal insulative material 10 is wound about the assembly 9 obtained in the above manner. In this state, the assembly 9 is accommodated in the casing 8 and actually supplied with exhaust gas. After a predetermined time elapses, the assembly 9 is removed and cut at a plurality of locations. The cut surfaces were observed with the naked eye.

Consequently, residuals of the fine particles were not confirmed at the peripheral portion of the assembly 9 (especially, the peripheral portion near the downstream end surface) where there is a tendency for unburned particles to remain. The fine particles were of course completely burned at other portions. It is considered that such results are obtained because the usage of the seal layer 15 prevents the conductance of heat between the filters F1 from being decreased and the temperature sufficiently increases at the peripheral portion of the assembly 9. Accordingly, in example 1-1, it is apparent that exhaust gas was efficiently processed.

Examples 1-2, 1-3

In example 1-2, the ceramic filter assembly 9 was prepared by setting the thickness t1 of the seal layer 15 at 1.0 mm. The other conditions were basically set in accordance with example 1-1. In example 3, the ceramic filter assembly 9 was formed by setting the thickness t1 of the seal layer 15 at 2.5 mm. The other conditions were basically set in accordance with example 1-1.

Then, the obtained two types of assemblies 9 were used for a certain period, and the cut surfaces were observed with the naked eye. The same desirable results as example 1-1 were obtained. Thus, it is apparent that the exhaust gas was efficiently processed in examples 1-2 and 1-3.

Example 1-4

In example 1-4, the employed seal layer forming paste was prepared by mixing and kneading 25 wt % of a ceramic fiber (mullite fiber, shot content rate 5 wt %, fiber length 0.1 mm-100 mm), 30 wt % of silicon nitride powder having an average grain diameter of 1.0 μm, 7 wt % of alumina sol (the conversion amount of alumina sol being 20%) serving as an inorganic binder, 0.5 wt % of poly vinyl alcohol serving as an organic binder, and 37.5 wt % of alcohol. The other portions were formed in accordance with example 1-1 to complete the ceramic filter assembly 9. The thickness t1 of the seal layer 15 was set at 1.0 mm. The thermal conductivity of the seal layer 15 was 0.2 W/mK.

Then, the obtained assembly 9 was used for a certain period, and the cut surfaces were observed with the naked eye. The same desirable results as example 1 were obtained. Thus, it is apparent that the exhaust gas was efficiently processed in example 4.

Example 1-5

In example 1-5, the employed seal layer forming paste was prepared by mixing and kneading 23 wt % of a ceramic fiber (alumina fiber, shot content rate 4 wt %, fiber length 0.1 mm-100 mm), 35 wt % of boron nitride powder having an average grain diameter of 1 μm, 8 wt % of alumina sol (the conversion amount of alumina sol being 20%) serving as an inorganic binder, 0.5 wt % of ethyl cellulose serving as an organic binder, and 35.5 wt % of acetone. The other portions were formed in accordance with example 1 to complete the ceramic filter assembly 9. The thickness t1 of the seal layer 15 was set at 1.0 mm. The thermal conductivity of the seal layer 15 was 2 W/mK.

Then, the obtained assembly 9 was used for a certain period, and the cut surfaces were observed with the naked eye. The same desirable results as example 1 were obtained. Thus, it is apparent that the exhaust gas was efficiently processed in example 5.

The ceramic filter assembly 9 of the first embodiment has the following advantages:

(1) In each example, the thickness t1 of the seal layer 15 is set in the preferable range of 0.3 mm-3 mm, and the thermal conductivity of the seal layer 15 is set in the preferable range of 0.1 W/mK-10 W/mK. This improves the thermal conductivity of the seal layer and prevents the thermal conductivity between the filters F1 from being decreased. Accordingly, heat is uniformly and quickly conducted to the entire assembly 9. This prevents a temperature difference from being produced in the assembly 9. Accordingly, the thermal uniformity of the assembly 9 is increased and the occurrence of locally unburned particles is avoided. The exhaust gas purification apparatus 1, which uses the assembly 9, has superior exhaust gas processing efficiency.

Further, if the thickness t1 and the thermal conductivity is within the above range, basic properties, such as adhesiveness and heat resistance remain the same. This avoids the manufacturing of the seal layer 15 from becoming difficult. Further, since the seal layer 15 serves to adhere the filters F1 to one another, breakage of the assembly 9 is avoided. In other words, the assembly 9 is relatively easy to manufacture and has superior durability.

(2) The seal layer 15 in each example contains as a solid 10 wt %-70 wt % of ceramic fibers. This enables the seal layer 15 to have high thermal conductivity and elasticity. Thus, the thermal conductivity between filters F1 is improved, and the thermal conductivity of the assembly 9 is further increased.

(3) The seal layer 15 in each example contains ceramic fibers, the lengths of which are 100 mm or shorter. Accordingly, the thickness t1 of the seal layer 15 may be set to 3 mm or less without any difficulties. This increases the heat conductivity between the filters F1 and thus contributes to the thermal uniformity of the assembly 9.

(4) The seal layer 15 in each example contains as a solid 3 wt %-80 wt % of inorganic particles. Thus, the seal layer 15 has high thermal conductivity. This increases the heat conductivity between the filters F1 and contributes to the thermal uniformity of the assembly 9.

(5) The seal layer 15 in the above examples are formed from at least an inorganic fiber, an inorganic binder, an organic binder, and inorganic particles. Further, the seal layer 15 is made of an elastic material formed by joining three-dimensionally intersecting the inorganic fibers with the inorganic particles with an inorganic binder and an organic binder.

Such material has the advantages described below. Sufficient adhesion strength is obtained in a low temperature range and a high temperature range. Further, the material is elastic. Thus, when thermal stress is applied to the assembly 9, the release of the thermal stress is ensured.

The first embodiment of the present invention may be modified as described below.

(a) The number of the filters F1 is not limited to 16 and may be any number. In this case, filters F1 having different dimensions and shapes may be combined.

Figure 6:
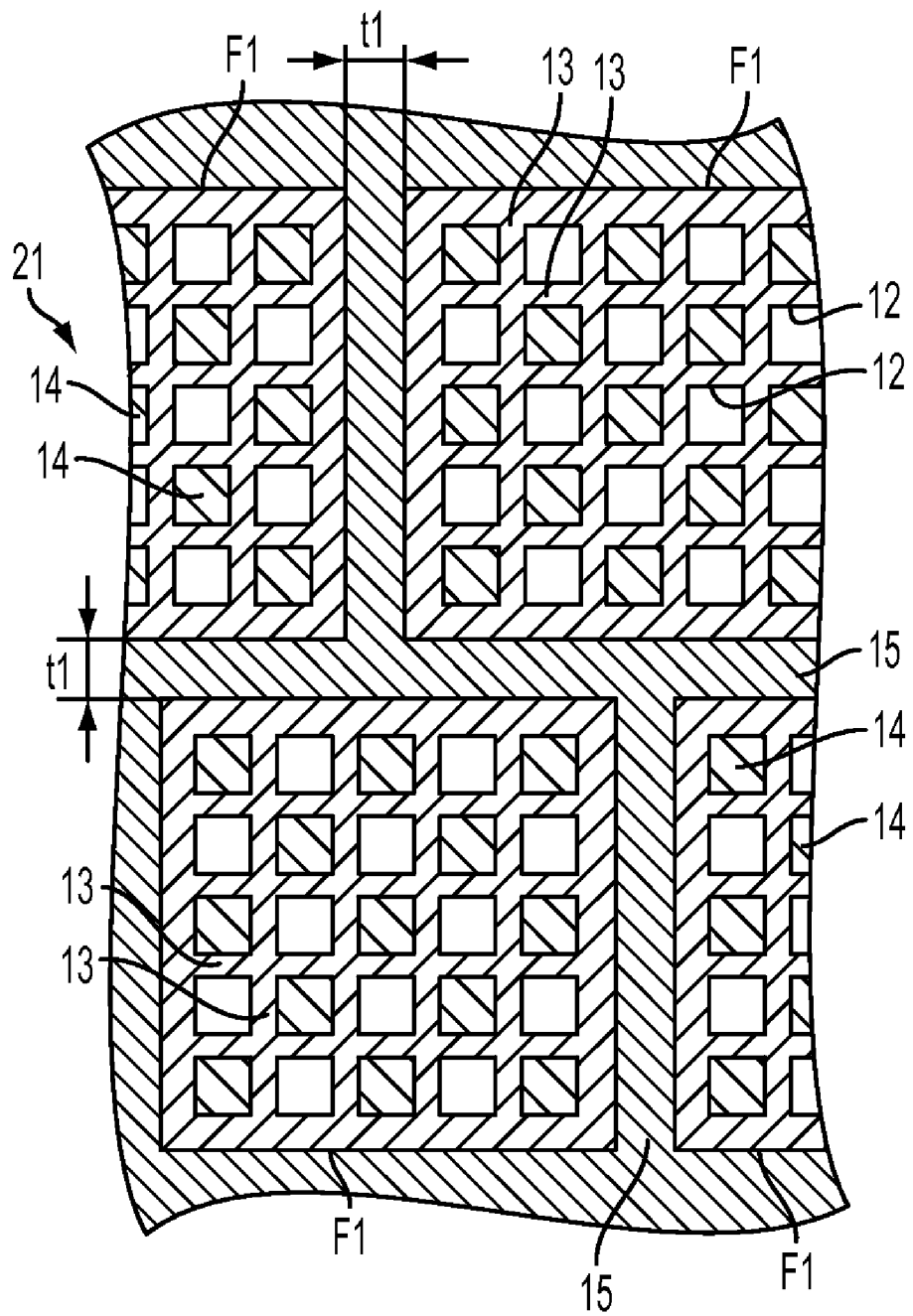
FIG. 6 is an enlarged cross-sectional view showing the main portion of a ceramic filter assembly of a first modified example.

(b) With reference to FIG. 6, in a ceramic filter assembly 21 of a further embodiment, the filters F1 are offset from one another in a direction perpendicular to the filter axial direction, and the filters F1 are adhered by the seal layer 15. In this case, the filters F1 resists displacement when being accommodated in the casing 8. This improves the breakage strength of the assembly 21. In the ceramic filter assembly 21 of FIG. 6, the seal layer 15 does not include cross-like portions. It is considered that this contributes to improvement of the breakage strength. Further, since the thermal conductivity in the radial direction of the assembly 21 is further improved, the thermal uniformity of the assembly 21 is further enhanced.

(c) Instead of the honeycomb filters F1, the filters may have a three-dimensional mesh structure, a foam-like structure, a noodle-like structure, or a fiber-like structure.

(d) Prior to the outer form cutting process, the form of the filter F1 is not limited to the elongated square shape and may have a triangular pole-like shape or a hexagonal pole-like shape. Further, the assembly 9 does not necessarily have to be formed to have a round cross-section during the outer form cutting process and may be formed to have a, for example, oval cross-section.

Figure 7:
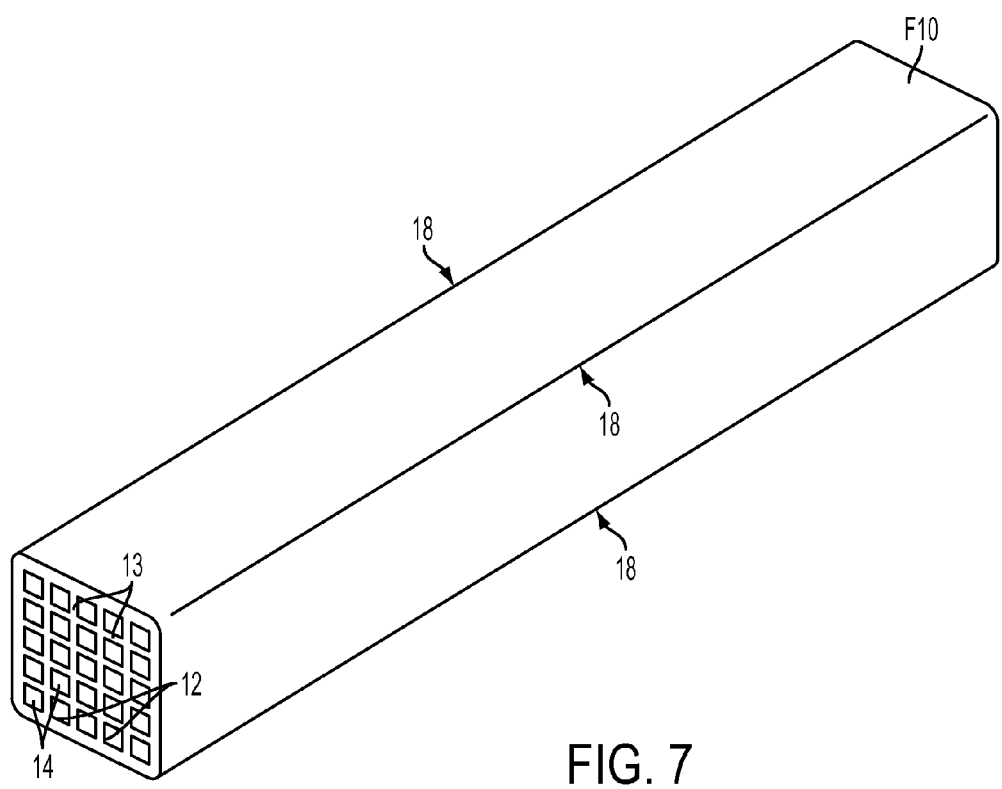
FIG. 7 is a perspective view showing a honeycomb filter according to a second embodiment of the present invention.
Figure 8:
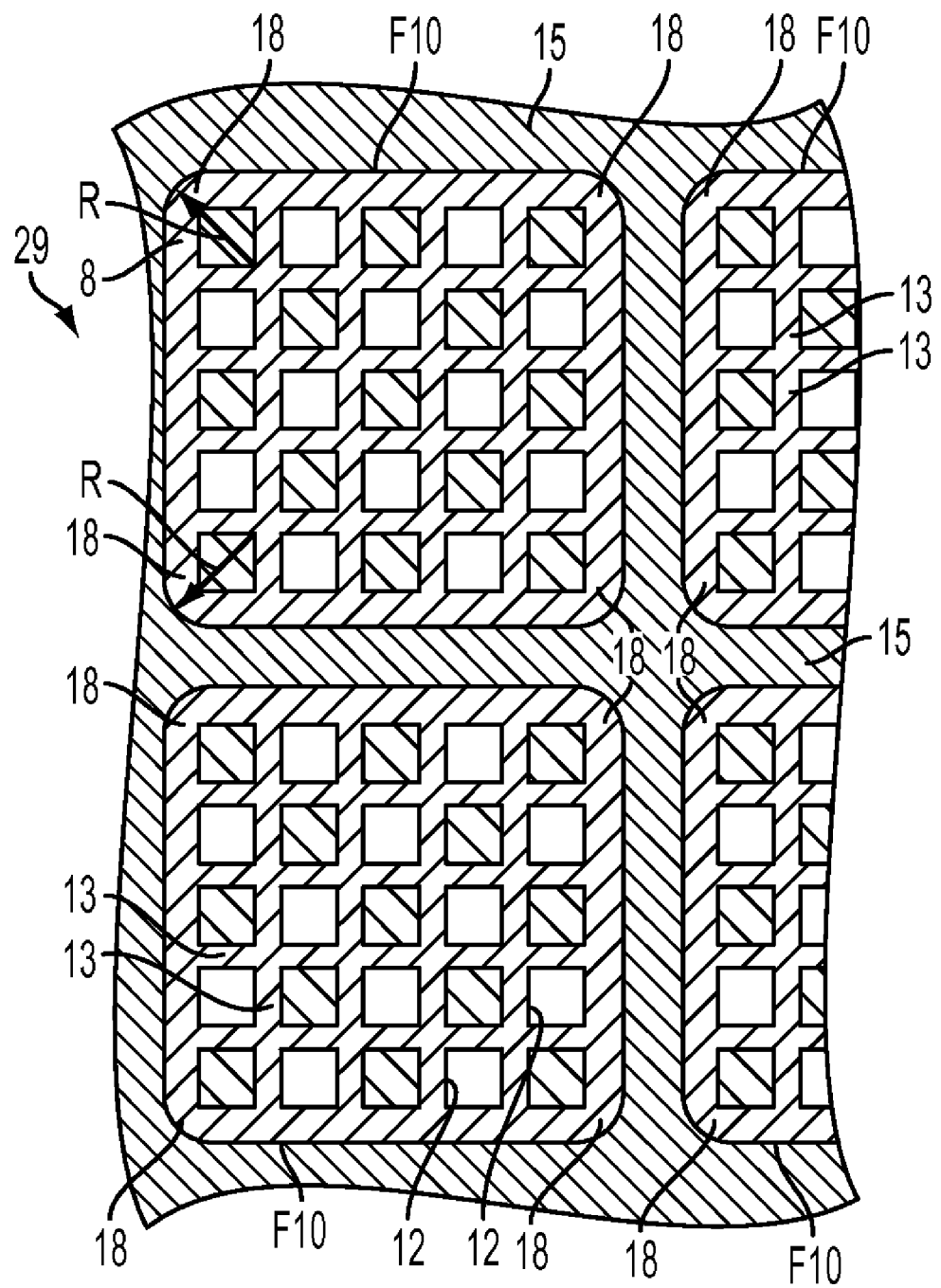
FIG. 8 is an enlarged cross-sectional view showing the main portion of a ceramic filter assembly.

FIG. 7 is a perspective view showing a honeycomb filter F10 of a ceramic filter assembly in a second embodiment of the present invention. FIG. 8 is an enlarged cross-sectional view showing the main portion of the exhaust gas purification apparatus. The corners on the outer surface of the honeycomb filter F10 are curved to define round surfaces 18. It is required that the curvature of the round surfaces 18 be R=0.3 to 2.5. It is further preferred that the curvature be R=0.7 to 2.5, and particularly preferred that the curvature be R=1.0 to 2.0.

When the curvature R is 0.3 or less, the corners are still angulated. Thus, the concentration of stress to the corners cannot be sufficiently avoided and the corners may chip or crack. On the other hand, if the curvature R exceeds 2.5, the cross-sectional area of the honeycomb filter F1 decreases. This reduces the effective number of cells and decreases the filtering capability of the assembly 29.

The ceramic filter assembly of the second embodiment is manufactured by chamfering each corner of an elongated square honeycomb molded product piece and forming the round surfaces 18 with the predetermined curvature R.

Example 2-1

In example 2-1, the ceramic filter assembly 29 was manufactured by drying molded products with a microwave dryer, cutting off each corner to perform chamfering, and forming the round surfaces 18 of R=1.5. The other steps are in accordance with example 1-1.

An assembly 29 obtained in the above manner was actually supplied with exhaust gas. After a predetermined time, the assembly 29 was removed and observed with the naked eye.

The result revealed that there were no cracks originating from the corners in the seal layer 15. Further, there was no chipping of the corners. Accordingly, it has become apparent that the assembly 29 of the example 2-1 is extremely superior in strength.

Examples 2-2, 2-3

In example 2, the ceramic filter assembly 9 was manufactured by setting the curvature of the round surfaces 18 at R=0.4 and forming the other portions basically in the same manner as in example 2-1. In example 2-3, the ceramic filter assembly 29 was manufactured by setting the curvature of the round surfaces 18 at R=2.4 and forming the other portions basically in the same manner as in example 2-1.

Then, the obtained two types of the assembly 29 were used for a certain time period in the same manner as example 2-1 and observed with the naked eye. A preferable result similar to that of example 2-1 was obtained. In other words, it has become apparent that the assemblies 29 of the examples 2-2, 2-3 are superior in strength.

Example 2-4

In example 2-4, the ceramic filter assembly 29 was manufactured by using a seal layer forming paste in the same manner as in example 1-4 and forming the other portions in the same manner as in example 2-1. The thickness of the seal layer was set at 1.0 mm, and the curvature of the round surface 18 of each corner was set at R=1.5.

Then, the obtained assembly 29 was used for a certain time period in the same manner as example 2-1 and observed with the naked eye. A preferable result similar to that of example 2-1 was obtained. In other words, it has become apparent that the assembly 29 of example 2-4 is superior in strength.

Example 2-5

In example 2-5, the ceramic filter assembly 29 was manufactured by using a seal layer forming paste in the same manner as in example 1-5 and forming the other portions in the same manner as in example 2-1. The thickness of the seal layer was set at 1.0 mm, and the curvature of the round surface 18 of each corner was set at R=1.5.

Then, the obtained assembly 29 was used for a certain time period in the same manner as example 2-1 and observed with the naked eye. A preferable result similar to that of example 2-1 was obtained.

Comparative Example

In the comparative example, the ceramic filter assembly 9 was manufactured without chamfering the corners and forming the other portions in the same manner as in example 2-1. Thus, the honeycomb filters F1 of the assembly 29 have angulated corners.

Then, the obtained assembly 29 was used for a certain time period in the same manner as example 2-1 and observed with the naked eye. Cracks and chipping caused by stress concentration were discovered at multiple locations. Accordingly, the assembly 29 was inferior in strength.

The ceramic filter assembly of the second embodiment has the advantages discussed below.

(1) The corners on the outer surface of the honeycomb filter F1 are round surfaces 18 having a curvature in an optimal range. This avoids stress concentration at the corners. Accordingly, the chipping of the corners of the honeycomb filter F1, the cracking of the seal layer 15 from the corners is prevented, and the ceramic filter assembly 29 resists breakage. This increases the strength of the assembly 29 and improves the strength and filtering capability of the exhaust gas purification apparatus 1, which employs the assembly 29.

(2) The assembly 29 employs the honeycomb filter 1, which is made of honeycomb sintered porous silicon carbide. As a result, the obtained assembly 29 has a higher filtering capability, less pressure loss, and superior heat resistance and heat conductance characteristics.

The second embodiment may be modified as described below.

Figure 9:
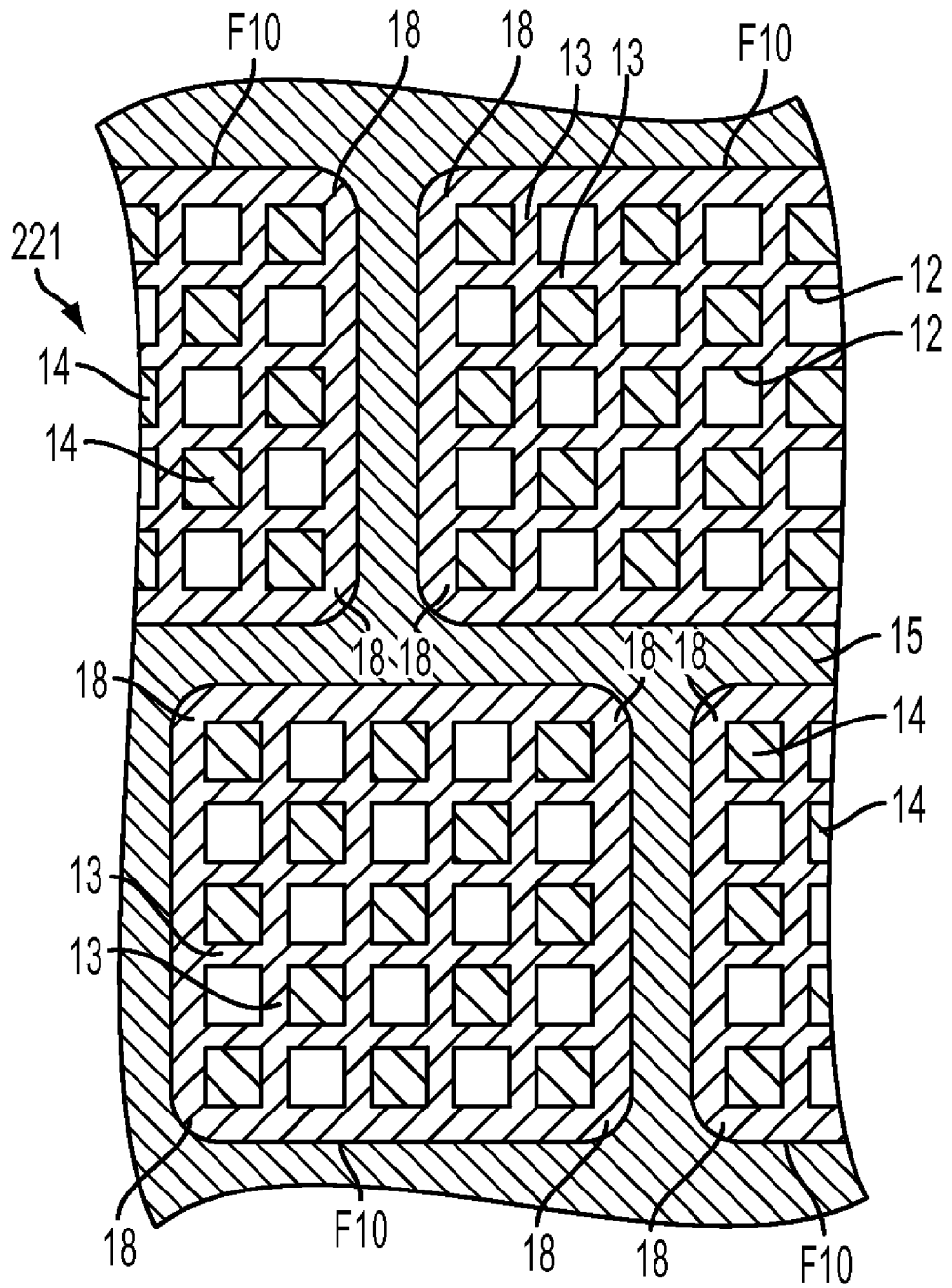
FIG. 9 is an enlarged cross-sectional view showing the main portion of a ceramic filter assembly according to a first modified example.

With reference to FIG. 9, the present invention may be embodied in a ceramic filter assembly 221 by offsetting the filters F1 from one another in a direction perpendicular to the filter axial direction.

Instead of forming the round surfaces 18 by chamfering the corners, the round surfaces may be formed simultaneously when molding the honeycomb molded product with a mold.

Figure 10:
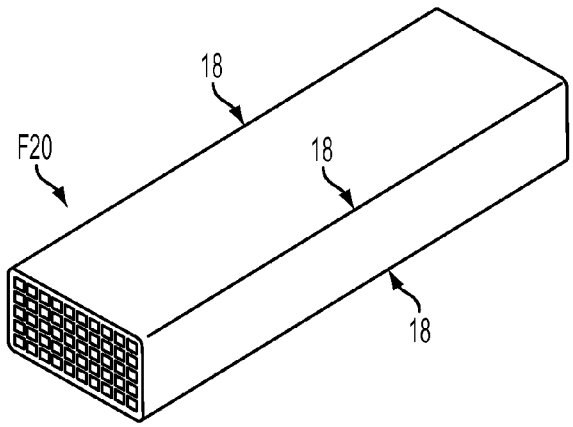
FIG. 10 is a perspective view showing the honeycomb filter according to the first modified example.
Figure 11:
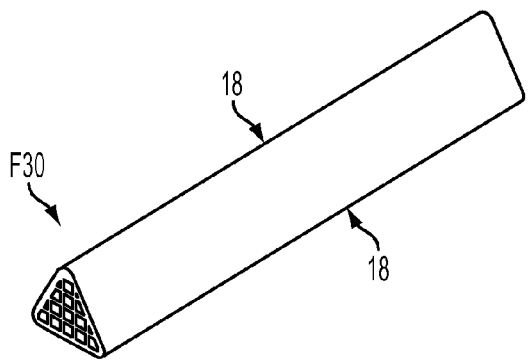
FIG. 11 is a perspective view showing a honeycomb filter according to a second modified example.
Figure 12:
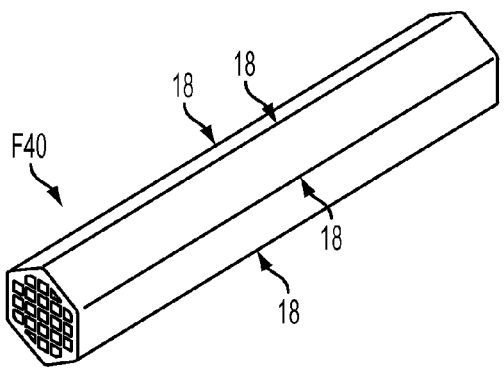
FIG. 12 is a perspective view showing a honeycomb filter according to a third modified example.

The honeycomb filter F1 is not required to be shaped into a rectangular pole, which has a square cross-section, prior to the outer form cutting process. For example, as shown in FIG. 10, a honeycomb filter F20 may be formed into a rectangular pole having a rectangular cross-section. Further, a honeycomb filter F30 may be triangular as shown in FIG. 11, and a honeycomb filter F40 may be hexagonal as shown in FIG. 12.

Figure 13:
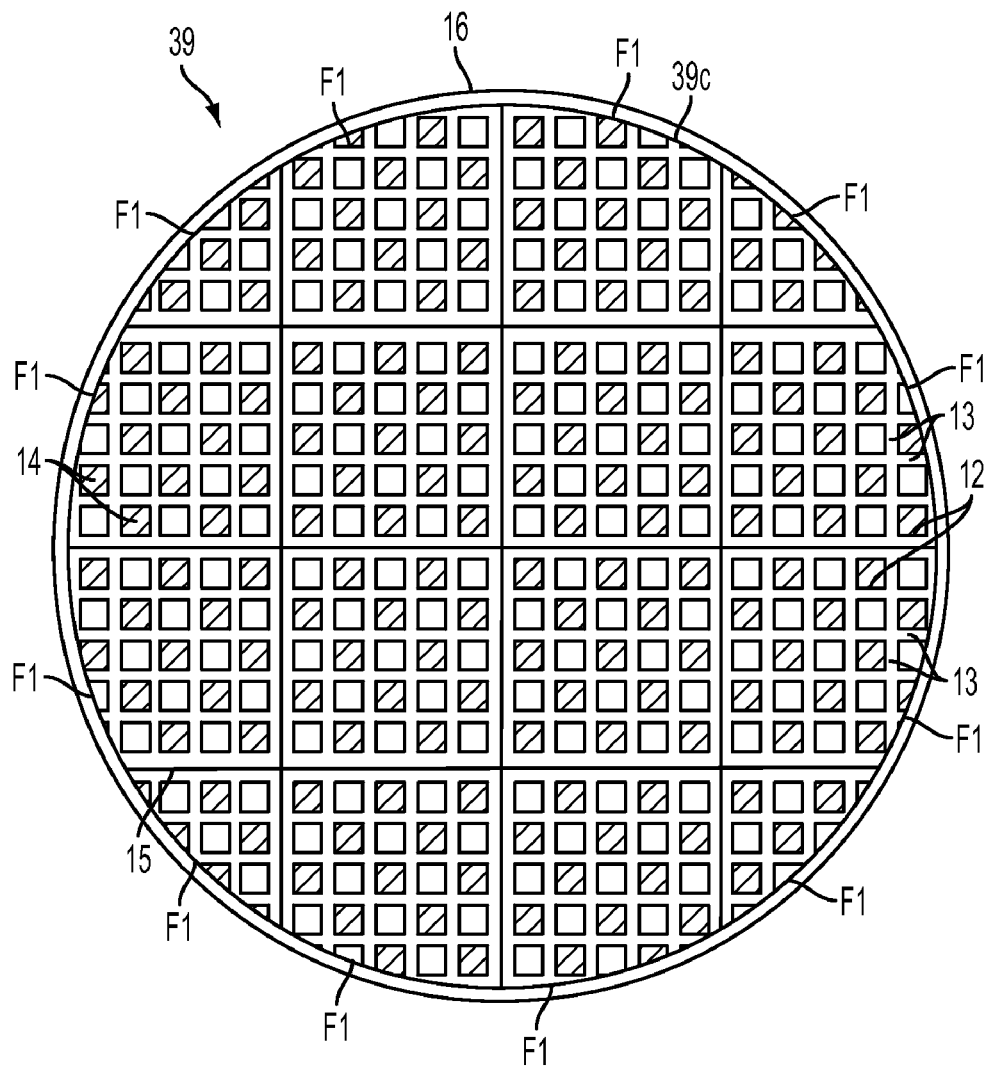
FIG. 13 is a side view showing a ceramic filter assembly according to a third embodiment of the present invention.

FIG. 13 is a schematic cross-sectional view showing a ceramic filter 39 according to a third embodiment of the present invention.

Figure 14A:
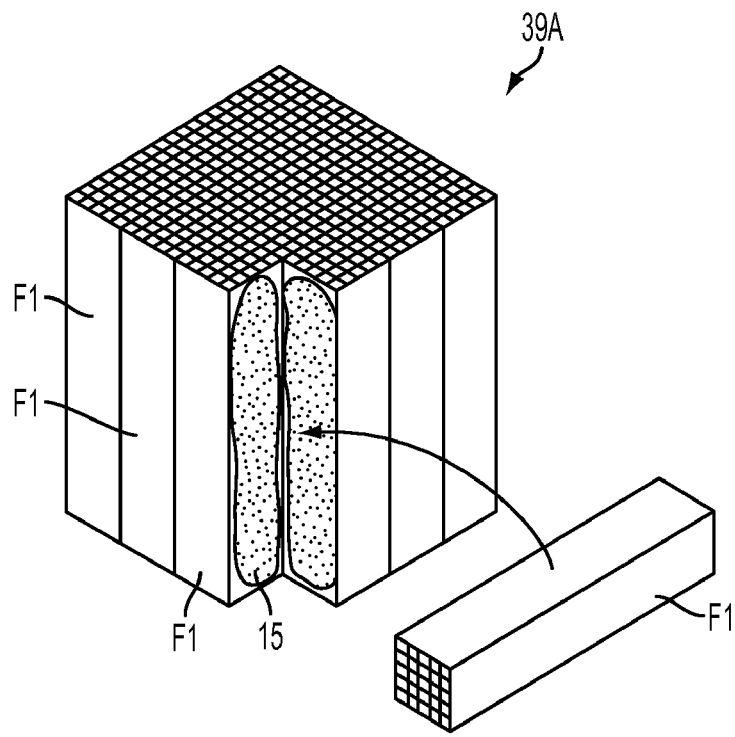
FIGS. 14(a) to 14(c) are schematic perspective views illustrating a manufacturing process of the ceramic filter assembly of FIG. 13.
Figures 14B, 14C:
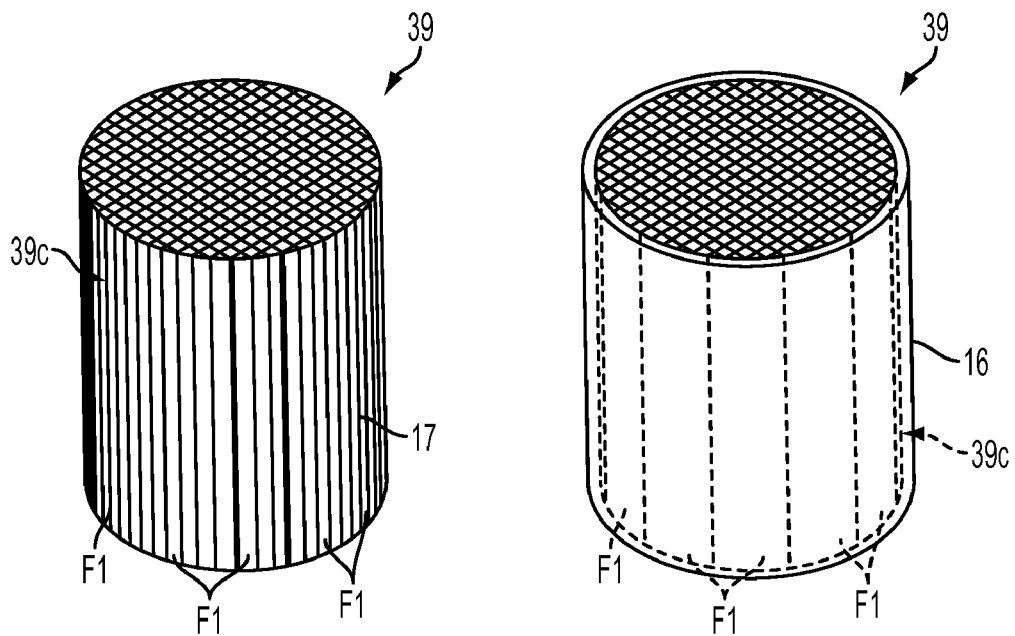

Referring to FIG. 13 and FIG. 14(b), the ceramic filter assembly 39 of the third embodiment has an outer surface 39c to which a ceramic smoothing layer 16 is applied. The smoothing layer 16 is made of a ceramic material that includes at least ceramic fibers and a binder. It is preferred that the ceramic material includes inorganic particles, such as silicon carbide, silicon nitride, and boron nitride. It is preferred that an inorganic binder, such as silica sol or alumina sol, or an organic binder, such as a polysaccharide, be used as the binder. It is preferred that the ceramic material be formed by binding three-dimensionally intersecting ceramic fibers and inorganic particles with a binder. It is preferred that the smoothing layer 16 be formed from the same type of material as the seal layer 15, and especially preferred that the smoothing layer 16 be made of exactly the same material as the seal layer 15.

It is preferred that the thickness of the smoothing layer 16 be 0.1 mm to 10 mm, further preferred that the thickness be 0.3 mm to 2 mm, and optimal that the thickness be 0.5 mm to 1 mm. If the smoothing layer 16 is too thin, pits 17 that are formed in the outer surface 9c of the ceramic filter assembly 9 cannot be completely filled. Thus, gaps tend to remain in such locations. On the other hand, if the smoothing layer 16 is thickened, the formation of the layer may become difficult, and the diameter of the entire assembly 9 may be enlarged.

It is preferred that the seal layer 15 be formed thinner than the smoothing layer 16, and more particularly, be formed in the range of 0.3 mm to 3 mm. When the seal layer 15 is thinner than the smoothing layer, the filtering capacity and the thermal conductance are prevented from being decreased beforehand.

The procedure for manufacturing the ceramic filter assembly 39 will now be described with reference to FIG. 14.

First, a ceramic raw material slurry used during an extrusion process, a sealing paste used during an end surface sealing process, a seal layer formation paste used during a filter adhesion process, and a smoothing layer formation paste are prepared. When using the seal layer formation paste to form the smoothing layer, the smoothing layer formation paste does not have to be prepared.

The ceramic raw material slurry is prepared by combining and kneading predetermined amounts of an organic binder and water with silicon carbide particles. The sealing paste is prepared by combining and kneading an inorganic binder, a lubricative agent, a plastic agent, and water with silicon carbide powder. The seal layer formation paste (smoothing layer formation paste) is prepared by combining and kneading predetermined amounts of an inorganic fiber, an inorganic binder, an organic binder, inorganic particles, and water.

Next, the ceramic raw material slurry is put into an extruder and continuously extruded from a mold. Afterward, the extruded honeycomb molded product is cut into equivalent lengths to obtain elongated square honeycomb molded product pieces. Further, a predetermined amount of the sealing paste is charged into one of the openings of each cell in the cut pieces to seal both end surfaces of each cut piece.

Then, main sintering is performed by setting predetermined conditions, such as the temperature and time, to completely sinter the honeycomb molded pieces and the sealing bodies 14. All of the sintered porous silicon carbide filters F1 obtained in this manner are still square pole-shaped.

The sintering temperature is set to 2,100° C. to 2,300° C. in the present embodiment to obtain the average pore diameter of 6 μm to 15 μm and a porosity of 35% to 50%. Further, the sintering time is set to 0.1 hours to 5 hours. Further, the interior of a furnace has an inert atmosphere during sintering, and the pressure in that atmosphere is the normal pressure.

Then, after forming a ceramic bedding layer to the outer surface of the filters F1 as required, the seal layer formation paste is applied thereto. The outer surfaces of sixteen of such filters F1 are adhered to each other and thus integrated. At this point, the ceramic filter assembly 39A as a whole has a square cross-section, as shown in FIG. 14(a).

In the following outer form cutting process, the assembly 39A, which has been obtained through the filter adherence process and has a square cross-section, is ground to form the outer shape of the assembly 9 by eliminating unnecessary sections from the peripheral portion of the assembly 39A.

As a result, the ceramic filter assembly 39 having around cross-section is obtained, as shown in FIG. 14(b). Cell walls 13 are partially exposed from the surface formed during the outer form cutting. Thus, pits 17 are formed in the outer surface 39c. The pits 17 are about 0.5 mm to 1 mm and are defined by ridges and valleys extending in the axial direction of the assembly 39 (i.e., the longitudinal direction of the filters F1).

In the following smoothing layer forming process, the seal layer formation paste is used as the smoothing layer formation paste and uniformly applied to the outer surface 9c of the assembly 39. This completes the ceramic filter assembly 39 shown in FIG. 14(c).

Example 3-1

(1) 51.5 wt % of a silicon carbide powder and 22 wt % of β silicon carbide powder were wet-mixed. Then, 6.5 wt % of the organic binder (methyl cellulose) and 20 wt % of water were added to the obtained mixture and kneaded. Next, a small amount of the plastic agent and the lubricative agent were added to the kneaded mixture, further kneaded, and extruded to obtain the honeycomb molded product.

(2) Then, after drying the molded product with a microwave dryer, the through holes 12 of the molded product were sealed by the sealing paste made of sintered porous silicon carbide. Afterward, the sealing paste was dried again with the dryer. After the end surface sealing process, the dried body was degreased at 400° C. and then sintered for about three hours at 2,200° C. in an argon atmosphere at normal pressure. This obtained the porous, honeycomb, silicon carbide filters F1.

(3) 23.3 wt % of a ceramic fiber (alumina silicate ceramic fiber, shot content 3%, fiber length 0.1 mm-100 mm), 30.2 wt % of silicon carbide having an average grain diameter of 0.3 μm, 7 wt % of silica sol (the converted amount of $SiO_2$ of the sol being 30%) serving as the inorganic binder, 0.5 wt % of carboxymethyl cellulose serving as the organic binder, and 39 wt % of water were mixed and kneaded. The kneaded material was adjusted to an appropriate viscosity to prepare the paste used to form the seal layer 15 and the smoothing layer 16.

(4) Then, the seal layer forming paste was uniformly applied to the outer surface of the filters F1. Further, in a state in which the outer surfaces of the filters F1 were adhered to one another, the filters F1 were dried and hardened under the condition of 50° C. to 100° C.×1 hour. As a result, the seal layer 15 adhered the filters F1 to one another. The thickness t1 of the seal layer 15 was set at 1.0 mm.

(5) Next, the peripheral portion was cut to shape the peripheral portion and complete the ceramic filter assembly 39, which has a round cross-section. Then, the seal and smoothing paste was uniformly applied to the expose outer surface 39c. The smoothing layer 16 having a thickness of 0.6 mm was dried and hardened under the condition of 50° C. to 100° C.×1 hour to complete the assembly 39.

The assembly 39 obtained in the above manner was observed with the naked eye. The pits 17 in the outer surface 39c were substantially completely filled by the smoothing layer 16, and the outer surface 39c was smooth. Further, there were no cracks in the boundary portions of the smoothing layer 16 and the seal layer 15. Accordingly, this indicates that the levels of adhesion and seal were high at the boundary portions.

No gaps were formed in the outer surface 9c of the assembly 39 when accommodating the assembly 39 encompassed by the thermal insulative material in the casing 8. Further, when actually supplying exhaust gas, there was no leakage of the exhaust gas through the gaps in the outer surface 39c from the downstream side. It is thus apparent that exhaust gas is efficiently processed in the third embodiment.

Example 3-2

In example 3-2, the seal and smoothing paste was prepared by mixing and kneading 25 wt % of a ceramic fiber (mullite fiber, shot content rate 5 wt %, fiber length 0.1 mm-100 mm), 30 wt % of silicon nitride powder having an average grain diameter of 1.0 μm, 7 wt % of alumina sol (the conversion amount of alumina sol being 20%) serving as an inorganic binder, 0.5 wt % of poly vinyl alcohol serving as an organic binder, and 37.5 wt % of alcohol. The other portions were formed in accordance with example 3-1 to complete the ceramic filter assembly 39.

Then, observations were made by the naked eye in the same manner as example 1. The pits 17 in the outer surface 39c were substantially completely filled by the smoothing layer 16. Further, there were no cracks in the boundary portions of the smoothing layer 16 and the seal layer 15. Accordingly, this indicates that the levels of adhesion and seal were high at the boundary portions.

No gaps were formed in the outer surface 39c of the assembly 39 during usage. In addition, leakage of exhaust gas through gaps in the outer surface 39c did not occur. It is thus apparent that exhaust gas was efficiently processed in example 3-2 in the same manner as example 3-1.

Example 3-3

In example 3-3, the seal and smoothing paste was prepared by mixing and kneading 23 wt % of a ceramic fiber (alumina fiber, shot content rate 4 wt %, fiber length 0.1 mm-100 mm), 35 wt % of boron nitride powder having an average grain diameter of 1 μm, 8 wt % of alumina sol (the conversion amount of alumina sol being 20%) serving as the inorganic binder, 0.5 wt % of ethyl cellulose serving as the organic binder, and 35.5 wt % of acetone. The other portions were formed in accordance with example 3-1 to complete the ceramic filter assembly 39.

Then, observations were made by the naked eye in the same manner as example 3-1. The pits 17 in the outer surface 39c were substantially completely filled by the smoothing layer 16. Further, there were no cracks in the boundary portions of the smoothing layer 16 and the seal layer 15. Accordingly, this indicates that the levels of adhesion and seal were high at the boundary portions.

No gaps were formed in the outer surface 39c of the assembly 39 during usage. In addition, leakage of exhaust gas through gaps in the outer surface 39c did not occur. It is thus apparent that exhaust gas was efficiently processed in example 3-3 in the same manner as example 3-1.

Comparative Example

In the comparative example, the smoothing layer 16 was not formed on the outer surface 39c. The other portions were formed in accordance with example 3-1 to complete a ceramic filter assembly.

Then, observations were made by the naked eye in the same manner as example 3-1. There were pits 17 in the outer surface 3-9c. Thus, gaps were formed in the outer surface 3-9c during usage of the assembly, and gas leakage through the gaps occurred. Accordingly, in comparison with examples 3-1 to 3-3, it is apparent that the exhaust gas processing efficiency was inferior.

Accordingly, the ceramic filter assembly 39 has the advantages described below.

(1) The smoothing layer 16 fills the pits 17 and smoothes the outer surface 9c. Accordingly, gaps are not formed in the outer surface 39c when the assembly 39 is retained. This prevents the leakage of exhaust gas. As a result, the ceramic filter assembly 39 has superior exhaust gas processing efficiency. This, in turn, results in the exhaust gas purification apparatus 1 having superior exhaust gas processing efficiency.

The smoothing layer 16 is made of ceramic and thus has superior adhesion with the filter F1, which is made of a sintered porous ceramic, and superior heat resistance. Accordingly, even if the assembly 39 is exposed to a high temperature of several hundred degrees Celsius, the smoothing layer 16 is not burned nor deformed. Thus, the desired adhesion strength is maintained.

(2) The thickness of the smoothing layer 16 is set in the preferred range of 0.1 mm to 10 mm. This prevents the leakage of exhaust gas without making the manufacture of the assembly 39 difficult.

(3) The seal layer 15 is thinner than the smoothing layer 16. This prevents the filtering capability and the thermal conductivity from decreasing.

(4) The smoothing layer 16 is made from the same material as the seal layer 15. Since the coefficient of thermal expansion of the smoothing layer 16 and that of the seal layer 15 are the same, the boundary portions of the seal and smoothing layer 15, 16 do not crack. In other words, high adhesiveness, sealing, and reliability of the boundary portions are ensured.

Further, a smoothing layer formation paste does not have to be prepared in addition to the seal layer formation paste. This facilitates the manufacture of the assembly 39 and avoids an increase in the manufacturing cost.

(5) The following may be used as the material for forming the seal layer 15 and the smoothing layer 16. An elastic material including at least an inorganic fiber, an inorganic binder, an organic binder, and inorganic particles and bound to one another by the inorganic binder and the organic binder may be used.

Such material has the advantage described below. The material has satisfactory adhesion strength in both low temperature and high temperature ranges. Further, the material is an elastic material. Thus, when thermal stress is applied, the thermal stress is relieved. Further, the material has superior thermal conductance. Thus, heat is uniformly and quickly conducted to the entire assembly 39. This enables efficient exhaust gas processing.

The third embodiment of the present invention may be modified as described below.

Figure 15:
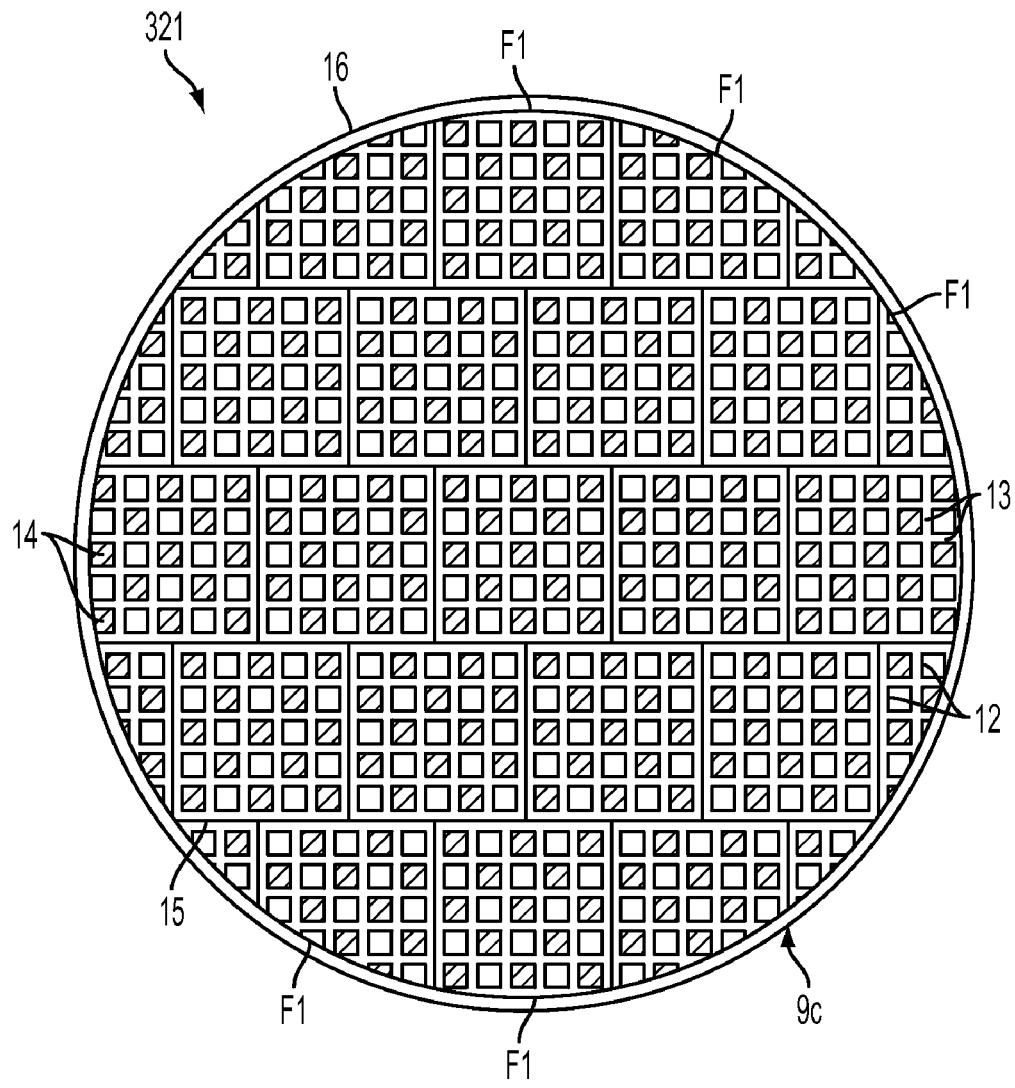
FIG. 15 is a side view showing a ceramic filter assembly according to a modified example.

(a) As shown in FIG. 15, the present invention may be embodied in a ceramic filter assembly 321 by offsetting the filters F1 from one another in a direction perpendicular to the filter axial direction.

(b) The smoothing layer 16 may be formed from a ceramic material that differs from that of the seal layer 15.

(c) The smoothing layer 16 may have the same thickness as the seal layer 15 or may have a greater thickness than the seal layer 15.

(d) In addition to forming the smoothing layer 16 by employing an application technique, other methods, such as a printing technique, a staining technique, a dip technique, and a curtain coat technique, may be employed.

Figure 16:
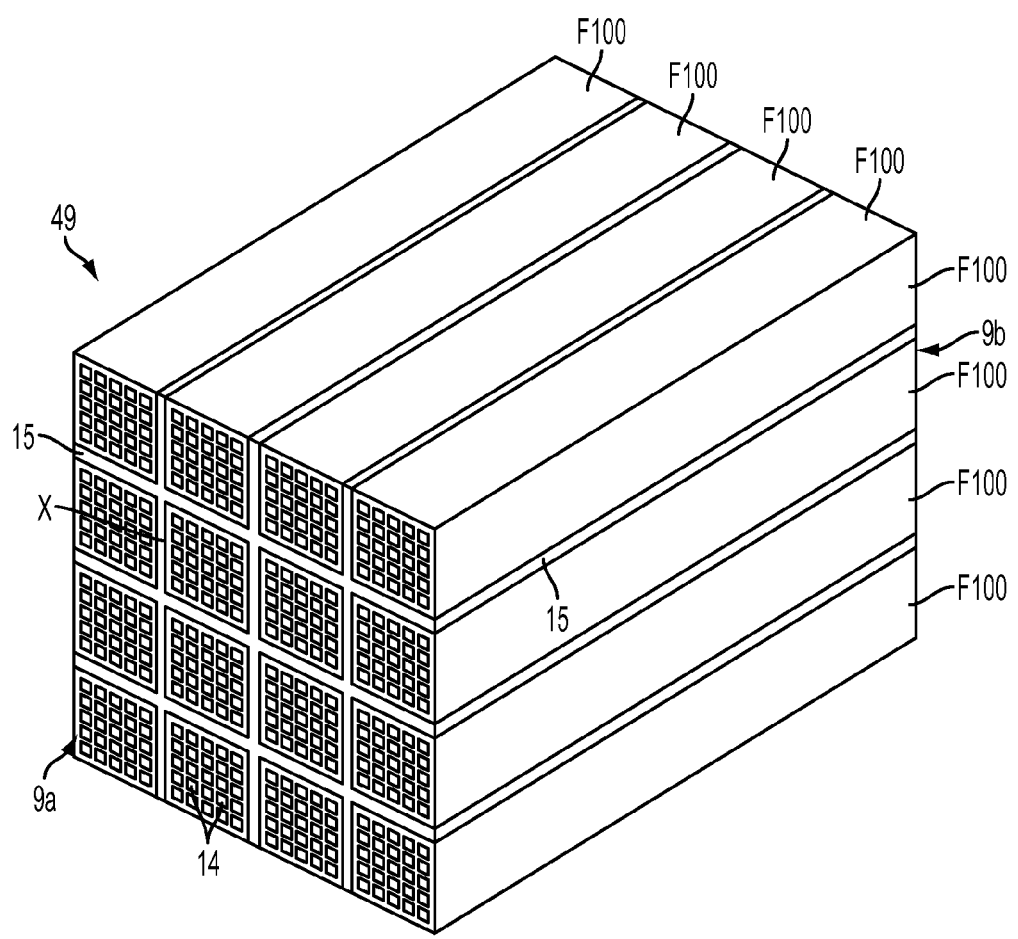
FIG. 16 is a perspective view of a ceramic filter assembly according to a fourth embodiment of the present invention.
Figure 17:
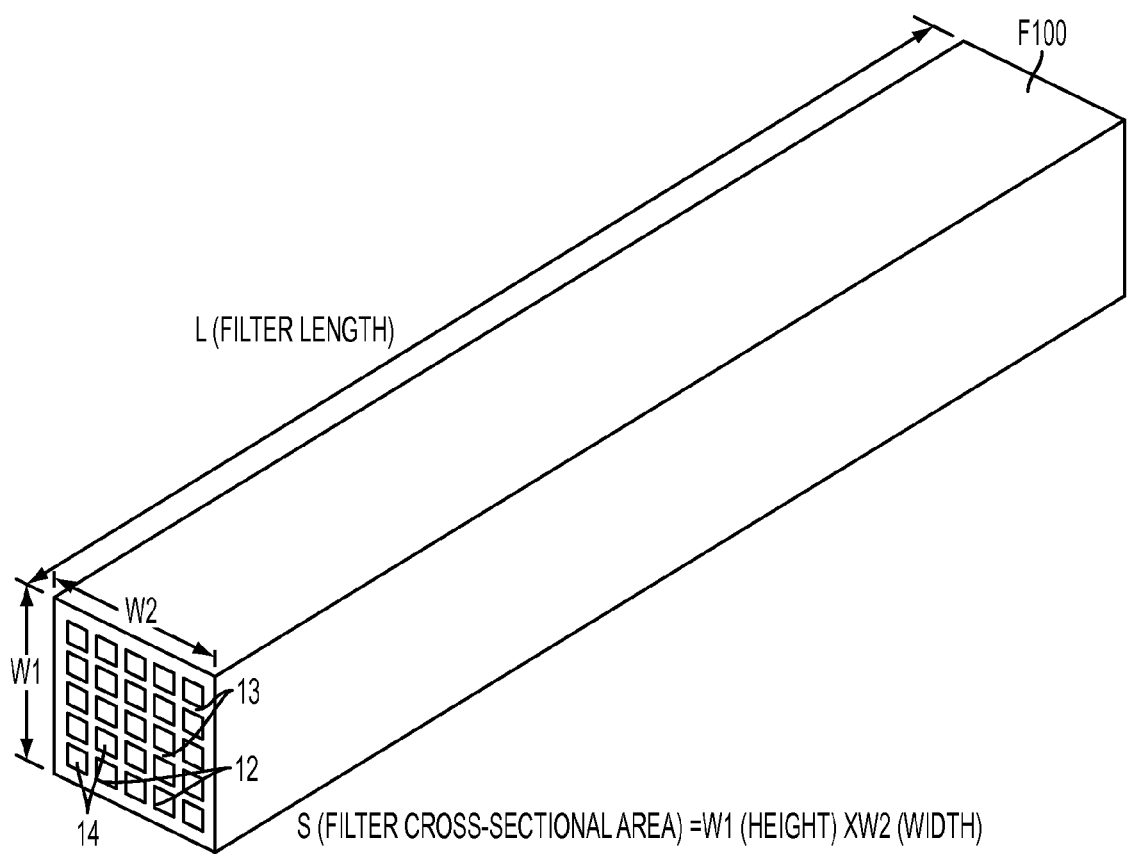
FIG. 17 is a perspective view showing a filter of the ceramic filter assembly 3 of FIG. 16.

FIG. 16 is a schematic perspective view of a ceramic filter assembly 49 according to a fourth embodiment of the present invention. The ceramic filter assembly 49 is formed by a plurality of rectangular pole-like honeycomb filters F100.

In each honeycomb filter F100, the flow direction of the exhaust gas (direction perpendicular to the filter end surface), which is the processed fluid, is defined as the filter length L (mm). Further, the area obtained when cutting each honeycomb filter F100 in a direction perpendicular to the flow direction (in other words, parallel to the filter end surface) is defined as the filter cross-sectional area S (mm$^2$).

In this case, the L/S value must be 0.06 mm/mm$^2$ to 0.75 mm/mm$^2$. It is preferred that the L/S value be 0.10 mm/mm$^2$ to 0.60 mm/mm$^2$, and most preferred that the L/S value be 0.15 mm/mm$^2$ to 0.40 mm/mm$^2$.

When the L/S value exceeds 0.75 mm/mm$^2$, a temperature difference is produced in the longitudinal direction of the filter. As a result, a high level of thermal stress is applied to the honeycomb filter F100 thereby permitting cracks to easily form. On the other hand, when the L/S value is 0.06 mm/mm$^2$ or less, a temperature difference is produced in a direction perpendicular to the filter longitudinal direction. This also applies a high level of thermal stress to the honeycomb filter F100 thereby permitting cracks to easily form.

It is specifically preferred that the filter length L be 120 mm to 300 mm, and especially preferred that the filter length be 140 mm to 200 mm. It is specifically preferred that the filter cross-sectional area S be 400 mm$^2$ to 2,500 mm$^2$, and especially preferred that the cross-sectional area S be 600 mm$^2$ to 2,000 mm$^2$, and especially preferred that the cross-sectional area S be 600 mm$^2$ to 2,000 mm$^2$. When the values of L and S are outside the preferred range, a temperature difference is produced in the honeycomb filter F100. As a result, a large level of thermal stress easily forms.

Example 4-1

Basically, the same assembly 49 as that of example 1-1 was manufactured. The height W of the filter F100 was 33 mm, the width W2 was 33 mm, and the length L was 167 mm. Accordingly, the filter cross-sectional area S was 1,089 mm$^2$, and the L/S value was 0.15 mm/mm$^2$ (=167/1089).

Then, the thermal insulative material 10 was wrapped around the assembly 49. In this state, the assembly was retained in the casing 8 and actually supplied with exhaust gas.

Referring to FIGS. 18(A) and 18(B), thermocouples were embedded in each of locations P1 to P6 and temperatures T1 to T6 were respectively measured for a certain period, respectively. Further, maximum temperature differences ΔT(° C.) at each of the locations P1 to P6 were obtained. The white arrow in the drawing shows the direction of the exhaust gas flow. The temperature measurement was conducted on the honeycomb filter F100 denoted with reference character X in FIG. 16.

After a predetermined time, the assembly 49 was taken out and the honeycomb filters F100 were each observed with the naked eye. As a result, the maximum temperature difference ΔT(° C.) of example 4-1 was about 5° C., the value of which is extremely small. Further, cracks were not confirmed in any of the honeycomb filters F100.

Examples 4-2 to 4-6

In examples 4 to 6, the assembly 49 was manufactured in the same manner as example 4-1. However, in example 4-2, the height W1 of each honeycomb filter F100 was set at 50 mm, the width W2 was set at 50 mm, and the length L was set at 150 mm. Accordingly, the filter cross-sectional area S was 2,500 mm$^2$, and the L/S value was (150/2,500=) 0.06 mm/mm$^2$.

In example 4-3, the height W1 was set at 20 mm, the width W2 was set at 20 mm, and the length L was set at 300 mm. Accordingly, the filter cross-sectional area S was 4,000 mm$^2$, and the L/S value was (300/400=) 0.75 mm/mm$^2$.

In example 4-4, the height W1 was set at 33 mm, the width W2 was set at 33 mm, and the length L was set at 230 mm. Accordingly, the filter cross-sectional area S was 1,089 mm$^2$, and the L/S value was (230/1089) 0.21 mm/mm$^2$.

In example 4-5 the height W1 was set at 25 m, the width W2 was set at 25 m, and the length L was set at 300 mm. Accordingly, the filter cross-sectional area S was 625 mm$^2$, and the L/S value was (300/625=) 0.48 mm/mm$^2$.

In example 4-6 the height W1 was set at 22 m, the width W2 was set at 22 m, and the length L was set at 300 mm. Accordingly, the filter cross-sectional area S was 484 mm$^2$, and the L/S value was (300/484=) 0.62 mm/mm$^2$.

An experiment was conducted on the five types of assemblies 59 in the same manner as in example 4-1. As a result, the maximum temperature difference ΔT(° C.) was about 0° C. to 10° C., the values of which are extremely small. Further, no cracks were confirmed in any of the honeycomb filters F100.

Comparative Example 1

In comparative example 1, the assembly 49 was manufactured in the same manner as in example 4-1. However, the height W1 of each honeycomb filter F100 was set at 20 mm, the width W2 was set at 20 mm, and the length L was set at 400 mm. Accordingly, the filter cross-sectional area S was 1,000 mm², and the L/S value was (400/400=) 1.00 mm/mm².

An experiment was conducted on the assembly 49 in the same manner as in example 4-1. As a result, the maximum temperature difference $\Delta T(° C.)$ was about 30° C. and greater than each embodiment. The length L in comparative example 1 was especially long. Thus, there was a tendency in a temperature difference being produced in the longitudinal direction of the filter.

Further, cracks were confirmed in some of the honeycomb filters F100, and the honeycomb filters F100 were damaged.

Comparative Example 2

In comparative example 2, the assembly 49 was manufactured in the same manner as in example 4-1. However, the height W1 was set at 70 mm, the width W2 was set at 70 mm, and the length L was set at 167 mm. Accordingly, the filter cross-sectional area S was 4,900 mm², and the L/S value was (167/4,900=) 0.03 mm/mm².

An experiment was conducted on the assembly 49 in the same manner as in example 4-1. As a result, the maximum temperature difference $\Delta T(° C.)$ was about 20° C. and greater than each embodiment. The filter cross-sectional area S in comparative example 2 was especially large. Thus, there was a tendency in a temperature difference being produced in a direction perpendicular to the longitudinal direction of the filter. Further, cracks were confirmed in some of the honeycomb filters F100, and the honeycomb filters F100 were damaged.

The advantages of the ceramic filter assembly 49 of the fourth embodiment will be discussed below.

(1) By setting the ratio L/S between the filter length L and the filter cross-sectional area in the preferable range, the production of a large thermal stress is prevented without producing a large temperature difference in each of the honeycomb filters F100. This prevents cracks from being produced in the honeycomb filters F100 and the honeycomb filters F100 resist being damaged. Due to the increase in the strength of each honeycomb filter F100, the ceramic filter assembly 49 is manufactured with superior strength. Further, the employment of the assembly 49 increases the strength of the exhaust gas purification apparatus 1 and enables usage over a long period.

The fourth embodiment may be modified as described below.

(a) As long as the condition of the L/S value being in the range of 0.06 mm/mm² to 0.75 mm/mm² is satisfied, the form of the honeycomb filter F100 may be changed to a cylindrical pole-like shape, a triangular pole-like shape, or a hexagonal pole-like shape.

(b) In addition to using the honeycomb filters F100 as a member forming the ceramic filter 49, the honeycomb filter F100 may be used as an independent filter.

Figure 19:
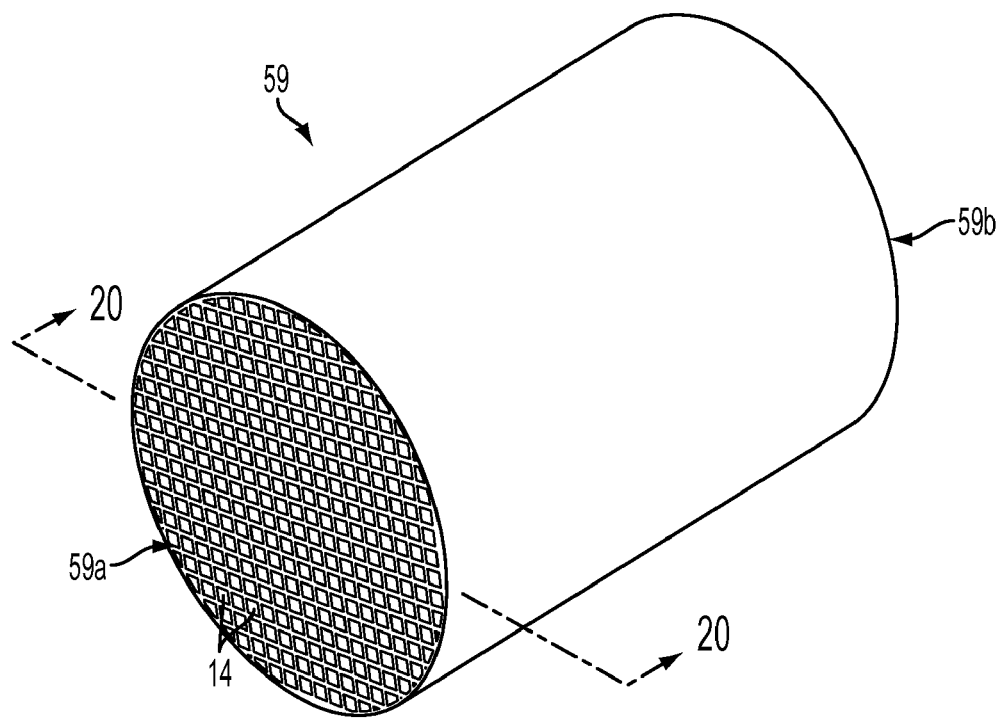
FIG. 19 is a perspective view showing a honeycomb filter provided with a honeycomb structure according to fifth and sixth embodiments of the present invention.
Figure 20:
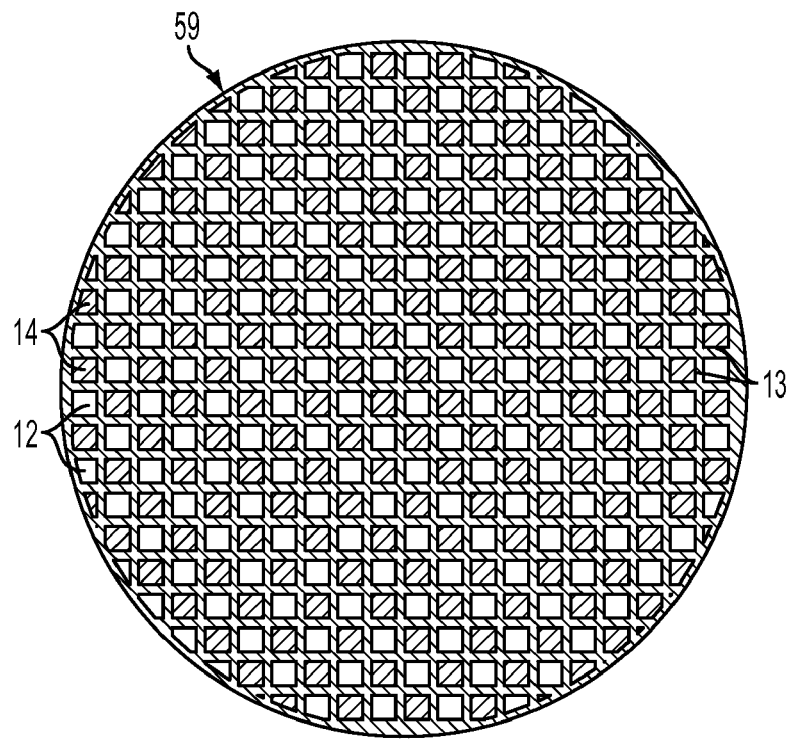
FIG. 20 is a cross-sectional view showing the filter 59 of FIG. 19 taken along line 20-20.
Figure 21:
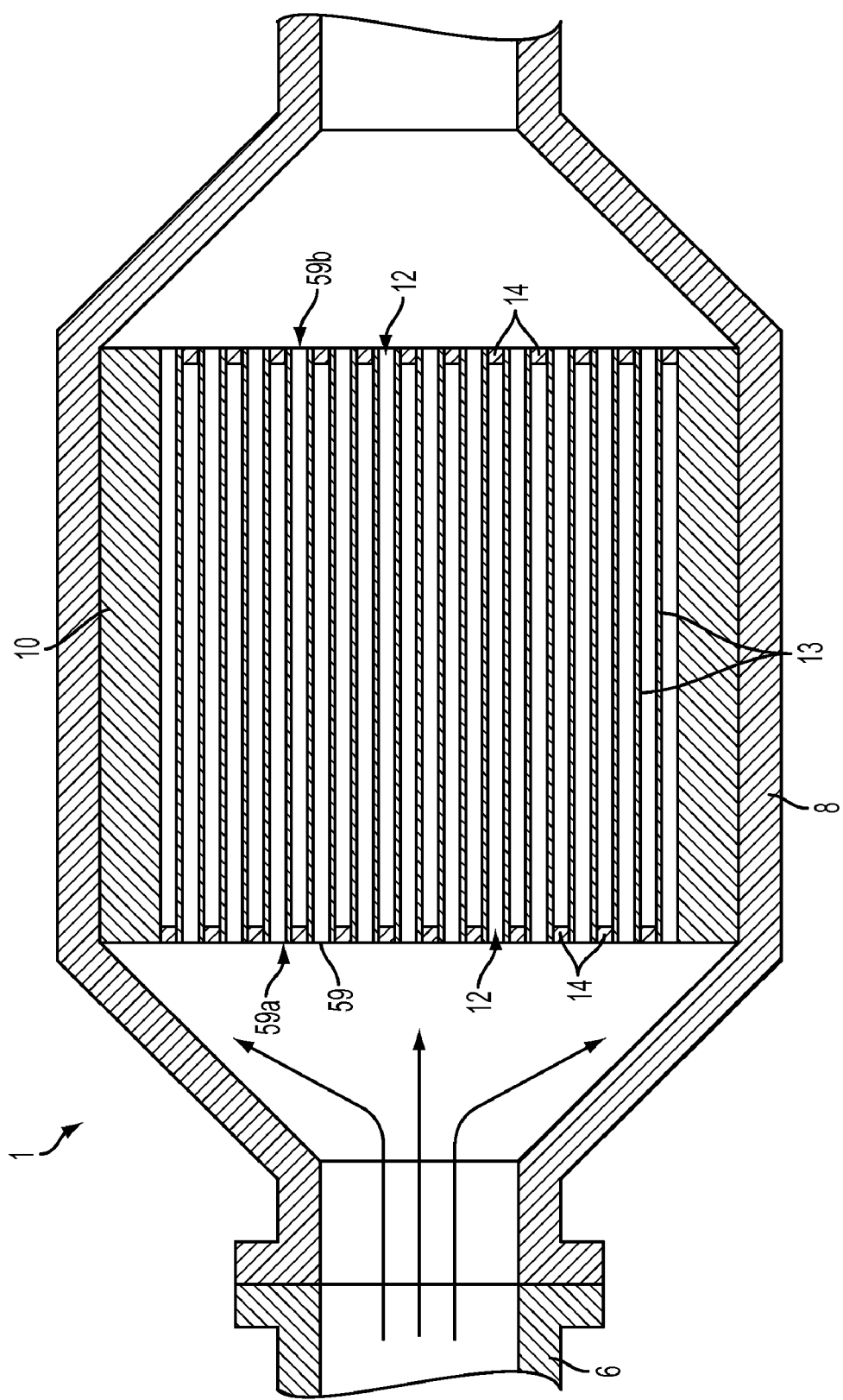
FIG. 21 is an enlarged cross-sectional view showing the main portion of an exhaust gas purification apparatus.

FIG. 19 is a perspective view showing a honeycomb filter 59 having a honeycomb structure according to a fifth embodiment of the present invention. FIG. 20 is a cross-sectional view taken along line 20-20 of the filter 59 of FIG. 19. FIG. 21 is a cross-sectional view showing a main portion of an exhaust gas purification apparatus.

It is preferred that the cell density of the honeycomb filter 59 be 120/inch² (18/cm²) or greater, and more specifically, be in the range of 120 to 180/inch. When the cell density is less than 120, the area of contact with the exhaust gas decreases. This lowers the purification capability of the honeycomb filter 9.

It is preferred that the thickness of the cell wall 13 be 0.46 mm or less, and more specifically be in the range of 0.20 to 0.46 mm. When the thickness of the cell wall 13 exceeds 0.46 mm, the opening area of the cell decreases and the area of contact with the exhaust gas decreases. This lowers the purification capability of the honeycomb filter 9. Further, if the cell wall 13 is made thicker than 0.46 mm while maintaining the cell opening area, the entire honeycomb filter 9 is enlarged.

It is preferred that the average pore diameter of the honeycomb filter 9 be 5 μm to 15 μm, and further preferred that the average pore diameter be 8 μm to 12 μm. If the average pore diameter is less than 5 μm, the deposit of particulates clogs the honeycomb filter 9. This increases pressure loss. Thus, the driving performance of the vehicle falls, fuel efficiency decreases, and the driving feel becomes unsatisfactory. On the other hand, if the average pore diameter exceeds 50 μm, fine particles cannot be trapped. This decreases the trapping efficiency and deteriorates the particulate filtering function.

It is preferred that the porosity of the honeycomb filter 9 be 30% to 50%, and further preferred that the porosity be 35% to 49%. If the porosity is less than 30%, the honeycomb filter 9 becomes too dense. This hinders the interior flow of exhaust gas. If the porosity exceeds 50%, the number of pores in the honeycomb filter 9 becomes excessive. This may decrease the strength and lower the trapping efficiency of fine particles.

Among the pores of the honeycomb filter 9, it is preferred that 20% or more be through pores. More specifically, it is preferred that 20% to 80% be through pores, and especially preferred that 20% to 50% be through pores. A through pore refers to a gap that extends through a cell wall 13 and connects adjacent holes 12. If the through pores are less than 20% of the pores, the pressure loss becomes large. Thus, the driving performance of the vehicle falls, fuel efficiency decreases, and the driving feel becomes unsatisfactory. On the other hand, if the through pores exceed 80% of the pores, manufacture may become difficult and cause stable material supply to be difficult.

It is preferred that total volume of the honeycomb filter 9 be ¼ to 2 times the total displacement of the engine. It is further preferred that the total volume be ½ to 1.5 times the total displacement. If the value is less than ¼, the deposit of particulates clogs the honeycomb filter 9. If the value exceeds 2 times, the honeycomb filter 9 is enlarged. When the honeycomb filter 9 is enlarged, there is a tendency of the temperature differing between portions of the filter 9 during combustion. This increases the thermal stress applied to the honeycomb filter 9 and increases the possibility of the formation of cracks.

The honeycomb filter 9 is made of sintered porous silicon carbide, which is a type of sintered carbide. The impurities included in the sintered porous silicon carbide is 5 wt % or less. It is preferred that the amount of impurities be 1 wt % or less and it is especially preferred that the amount of impurities be 0.1 wt % or less. If the impurities exceed 5 wt %, impurities concentrate at the grain boundary of the silicon carbide crystal grains and significantly decreases the strength at the grain boundary (strength bonding crystal grains). This makes the grain boundary vulnerable to breakage. Impurities include Al, Fe, O and free C. Like the honeycomb filter 9, the honeycomb filter 9 is made of sintered porous silicon carbide.

Example 5-1

Basically, in the same manner as the example 4-1, the through holes 12 of the molded product were dried with a microwave dryer and then sealed with a sealing paste made of sintered porous silicon carbide. Afterward, the drier was used again to dry the sealing paste. Subsequent to the end sealing process, the dried product was degreased at 400° C. and then sintered for about three hours at 2,250° C. in an argon atmosphere under normal pressure.

As a result, the produced sintered porous silicon carbide honeycomb filter 59 had a pore diameter of 10 μm, a porosity of 42%, a through pore existence rate of 25% relative to the pores, a cell density of 150/inch$^2$, and a cell wall 13 thickness of 0.4 mm. The honeycomb filter 59 had a diameter of 100 mm, a length of 200 mm, and a total volume of 2,300 cm$^3$. The total volume refers to the volume obtained by subtracting the volume of the through holes 12 from the volume of the entire honeycomb filter 59. It is preferred that the thickness of the cell wall 13 be 0.46 mm or less, and more specifically, in the range of 0.20 to 0.46 mm.

Then, the honeycomb filter 59 was wrapped around the honeycomb filter 59. In this state, the honeycomb filter 59 was retained in the casing. An engine having a displacement of about 3,000 cc was then used to supply the exhaust gas purification apparatus 1 with exhaust gas at a flow rate of 7 m/sec. In this state, the pressure value of the exhaust gas at the upstream side of the honeycomb filter 59 and the pressure value of the exhaust gas at the downstream side were measured. A pressure loss ΔP (mmAq), which is the difference between the values, was obtained. Further, the amount of soot at the rear side of the honeycomb filter 59 was measured to confirm the amount of particulates that were not trapped. Further, a certain time period, the honeycomb filter 59 was taken out and observed with the naked eye to confirm cracks. The results are shown in table 1.

5-1. However, in examples 5-2 and 5-3, only the total volume of the honeycomb filter 59 was the same as that of example 5-1. The mixture ratio, sintering temperature, sintering time, etc. were changed as described below to adjust the pore diameter, porosity, and the through pore existence rate relative to the pores.

In the produced sintered porous silicon carbide honeycomb filter 59 of example 5-2, the pore diameter was 6 μm, the porosity was 32%, and the through pore existence rate was 30%. The same experiment as that of example 5-1 was conducted. The pressure loss ΔP was about 100 mmAq, the value of which is extremely small. The particulate leakage amount was about 0.01 g/km, the value of which is extremely small. The honeycomb filter 59 had a flexural strength of 6.2 Mpa and had an extremely high level of mechanical strength. Further, there were no cracks in the honeycomb filter 59.

In the produced sintered porous silicon carbide honeycomb filter 59 of example 5-3, the pore diameter was 14 μm, the porosity was 48%, and the through pore existence rate was 45%. In the experiment result of this example, the pressure loss ΔP was about 60 mmAq, the value of which is extremely small. The particulate leakage amount was about 0.015 g/km, the value of which is extremely small. The honeycomb filter 59 had a flexural strength of 6.0 Mpa and had an extremely high level of mechanical strength. There were no cracks in the honeycomb filter 59.

Comparative Examples 1 to 3

In comparative examples 1 to 3, honeycomb filters were manufactured basically in the same manner as in example 5-1. However, in comparative example 1, the total volume of the honeycomb filter was 700 cm$^3$, which is less than ¼ the displacement (3,000 cc). Further, the pore diameter, porosity, and the through pore existence rate relative to the pores was as described below.

In the produced sintered porous silicon carbide honeycomb filter of comparative example 1, the pore diameter was 3 μm, the porosity was 10%, and the through pore existence rate was 10%. In the experiment result of comparative example 1, the

TABLE 1

| | Type of Ceramic | Average Pore Diameter (μm) | Average Porosity (%) | Existence Rate of Through Pores (%) | Pressure Loss ΔP (mmAq) | Soot Amount Behind Filter (g/km) | Flexural Strength (Mpa) | Total Filter Volume (cm$^3$) | Cracks |
|---|---|---|---|---|---|---|---|---|---|
| Example 1 | Silicon Carbide | 10 | 42 | 25 | 80 | 0.01 | 6.5 | 2300 | None |
| Example 2 | Silicon Carbide | 6 | 38 | 30 | 100 | 0.01 | 6.2 | 2300 | None |
| Example 3 | Silicon Carbide | 14 | 48 | 45 | 60 | 0.015 | 6.0 | 2300 | None |
| Comparative Example 1 | Silicon Carbide | 3 | 10 | 10 | 300 | 0.005 | 7.2 | 700 | None |
| Comparative Example 2 | Silicon Carbide | 20 | 70 | 15 | 40 | 0.04 | 2.5 | 7000 | Confirmed |
| Comparative Example 3 | Cordierite | 30 | 20 | 15 | 120 | 0.015 | 3.1 | 700 | Confirmed |

As shown in table 1, the pressure loss ΔP in example 5-1 was about 80 mmAq, the value of which is extremely small. The particulate leakage amount was about 0.01 g/km, the value of which is extremely small. The honeycomb filter 9 had a flexural strength of 6.5 Mpa and had an extremely high level of mechanical strength. There were no cracks in the honeycomb filter 9.

Example 5-2, 5-3

In examples 5-2 and 5-3, the honeycomb filter 59 was manufactured basically in the same manner as in example pressure loss ΔP was about 300 mmAq, the value of which is extremely large. The particulate leakage amount was about 0.005 g/km, the value of which is extremely small. The honeycomb filter had a flexural strength of 7.2 Mpa and had an extremely high level of mechanical strength. There were no cracks in the honeycomb filter.

In comparative example 2, the total volume of the honeycomb filter was greater than that of examples 1-3 and was 7,000 cm$^3$, which is two times or greater than the displacement (3,000 cc). Further, in the produced sintered porous silicon carbide honeycomb filter, the pore diameter was 20 μm, the porosity was 70%, and the through pore existence rate was 15%. In the experiment result of comparative example 2, the pressure loss ΔP was about 40 mmAq, the value of which is extremely small. The particulate leakage amount was about 0.04 g/km, the value of which is extremely small. The honeycomb filter had a flexural strength of 2.5 Mpa and satisfactory mechanical strength was not obtained. There were no cracks in the honeycomb filter.

In comparative example 3, a cordierite honeycomb filter was produced through a known manufacturing method that differs from the manufacturing method of comparative examples 1 and 2. The total volume of the honeycomb filter was 700 cm³. In the honeycomb filter, the pore diameter was 30 μm, the porosity was 20%, and the through pore existence rate was 15%. In the experiment result of comparative example 3, the pressure loss ΔP was about 120 mmAq, the value of which is large. The particulate leakage amount was about 0.015 g/km, the value of which is large. The honeycomb filter had a flexural strength of 3.1 Mpa and satisfactory mechanical strength was not obtained. There were no cracks in the honeycomb filter.

Table 1 shows the comparison result of examples 5-1 to 5-3 and comparative examples 1 to 3, as described above.
Experiment Result As apparent from table 1, it was confirmed that exhaust gas passed smoothly through all of the honeycomb filters 59 in examples 5-1 to 5-3. Further, the particulate leakage amount was substantially null, and the required mechanical strength of the honeycomb filter was obtained. In comparison, the required mechanical strength of the honeycomb filter was obtained in comparative example 1. However, exhaust gas did not pass smoothly through the honeycomb filter. Further, in comparison example 2, exhaust gas passed smoothly through the honeycomb filter. However, the required mechanical strength was not obtained. In example 3, exhaust gas did not pass smoothly through the honeycomb filter, and the required mechanical strength was not obtained.

The advantages of the honeycomb filter 59 of the fifth embodiment will now be discussed.

(1) The sintered porous silicon carbide honeycomb filter 59 is arranged in the casing 8. The honeycomb filter 9 is formed so that the average pore diameter is 5 to 15 μm, the average porosity is 30 to 40%, and the through pore existence rate relative to the pores is 20% or greater. Since the honeycomb filter 9 is not excessively dense, exhaust gas passes smoothly through the interior, and pressure loss is decreased. This improves fuel efficiency and prevents deterioration of the driving feel. Further, since the amount of gaps in the honeycomb filter 9 is not excessive, fine particulates are trapped and the trapping efficiency is improved. Additionally, even if the honeycomb filter 9 is porous, satisfactory mechanical strength is obtained. Thus, the produced honeycomb filter 9 resists breakage caused by vibrations and thermal impact.

(2) The honeycomb filter 9 is formed so that the average pore diameter is 8 to 12 μm, the average porosity is 35 to 49%, and the through pore existence rate relative to the pores is 20 to 50% or greater. Thus, the pressure loss is further decreased, and the strength is increased.

(3) The end surfaces of the honeycomb filter 9 so that the sealing bodies 14 seal the cells alternately. The number of cells per square inch is 120 or more, and the thickness of the cell wall 13 is 0.46 mm or less. This increases the area of contact with the exhaust gas and increases the purification capability of the honeycomb filter 9.

(4) The total volume of the honeycomb filter 9 is ¼ to 2 times the total displacement of the diesel engine 2. Since the deposit amount of the particulates does not become excessive, clogging of the honeycomb filter 9 is prevented. Further, the honeycomb filter 9 is not enlarged. This prevents the occurrence of temperature differences between different locations of the honeycomb filter 9 during combustion. Accordingly, the thermal stress applied to the honeycomb filter 9 is decreased and cracks are not produced.

The fifth embodiment may be modified as described below.

(a) The form of the honeycomb filter 9 is not limited to a cylindrical pole-like shape and may be changed to a cylindrical pole-like shape, a triangular pole-like shape, or a hexagonal pole-like shape.

Figure 22:
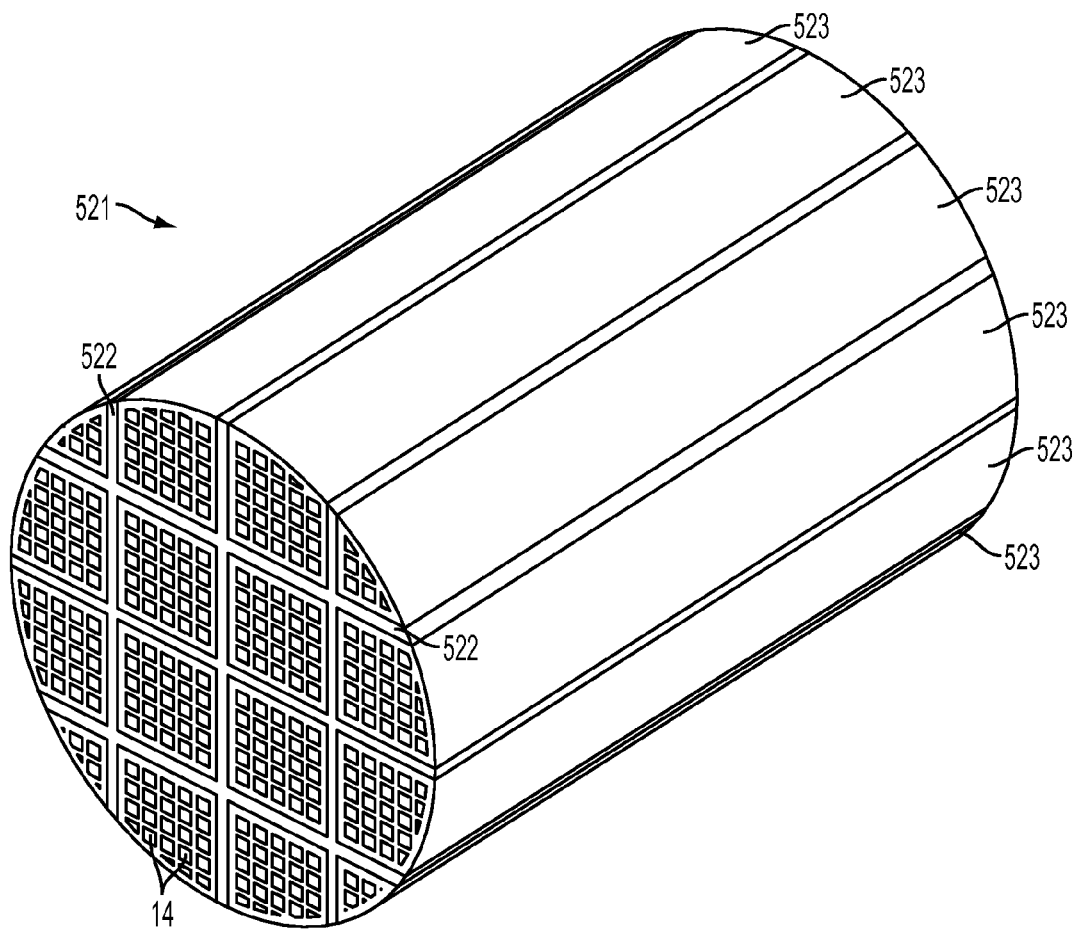
FIG. 22 is a perspective view showing a ceramic filter assembly.

(b) As shown in FIG. 22, a plurality (16) of honeycomb filters 523 may be integrated to manufacture a ceramic filter assembly 521. In each polygonal honeycomb filter 523, the average pore diameter is 8 to 12 μm, the average porosity is 35 to 49%, and 20 to 50% of the pores are through pores. The outer surfaces of the honeycomb filters 523 are connected to one another by a ceramic seal layer 522.

In a sixth embodiment, a specific surface area of the particles forming the cell wall 13 of the honeycomb filter 59 is 0.1 m²/g or more, and more specifically, 0.1 to 1 m²/g. If the specific surface area of the cell walls 13 is 0.1 m²/g or less, the deposit of the particulates clogs the honeycomb filter 59. This increases pressure loss and thus decreases the fuel efficiency of the vehicle and degrades the feeling drive. If the specific surface area exceeds 1.0 m²/g, fine particulates cannot be trapped. This decreases the trapping efficiency and causes the filtering function of the honeycomb filter 59 to become unsatisfactory.

Example 6-1

A honeycomb filter 59 was produced basically in the same manner as that of example 5-1 and the specific surface area of the particles forming the cell wall 13 was 0.3 m²/g. In example 6-2 and the comparative example, honeycomb filters 59 were produced basically in the same manner as example 5-1. The specific surface area of the honeycomb filter 59 of example 6-2 was 0.8 m²/g, and the specific surface area of the honeycomb filter 59 of the comparative example was 0.05 m²/g. In each of the honeycomb filters 50 of examples 6-1, 6-2 and the comparative example, the cell density was 150/inch² and the thickness of the cell wall 13 was 0.4 mm.

The honeycomb filter 59 was wrapped by the thermal insulative material 10. In this state, the honeycomb filter 59 was retained in the casing 8. A diesel engine 2 having a displacement of about 3,000 cc was then used to supply the exhaust gas purification apparatus 1 with exhaust gas at a flow rate of 9 m/sec. In this state, the pressure value of the exhaust gas at the upstream side of the honeycomb filter 59 and the pressure value of the exhaust gas at the downstream side were measured. A pressure loss ΔP (mmAq), which is the difference between the values, was obtained. The results are shown in table 2.

TABLE 2

|  | Example 1 | Example 2 | Comparative Example |
|---|---|---|---|
| Specific Surface Area (cm²/g) | 0.3 | 0.8 | 0.05 |
| Particulate Pressure Loss (mmAq) | 180 | 120 | 250 |

As apparent from table 2, the pressure loss ΔP of the honeycomb filters 59 in example 6-1, example 6-2, and the comparative example was 180 mmAq, 120 mmAq, and 250 mmAq, respectively. Accordingly, in examples 6-1 and 6-2, a large pressure loss such as that of the comparative example was not confirmed.

The honeycomb filter 59 of the sixth embodiment has the advantages described below.

(1) In the honeycomb filter 9, the specific surface area of the particles forming the cells wall 13 is 0.1 m²/g or greater. Since the honeycomb filter 9 does not become excessively dense, exhaust gas passes smoothly though the interior, and the pressure loss is decreased. Accordingly, fuel efficiency is improved and degradation of the driving feel is prevented. In addition, the upper limit of the specific surface area of the particles is 1.0 m²/g. Thus, the gap amount of the honeycomb filter 9 is not excessive and the trapping of fine particles is ensured. This improves the trapping efficiency.

(2) The sintered silicon carbide cell wall 13 has superior heat resistance. This prevents the cell wall 13 from being deformed or burned away. Accordingly, fluid is efficiently purified over a long time period.

(3) The porous cell wall 13 enables smooth passage of the exhaust gas and further decreases power loss. In addition, the trapping efficiency of particulates is further increased.

The sixth embodiment may be modified as described below.

A plurality (16) of honeycomb filters may be integrated to manufacture a ceramic filter assembly. The specific surface area of the cell wall of each honeycomb filter is 0.1 to 1 m²/g.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb filter comprising:
   cell walls extending along a longitudinal direction of the honeycomb filter to define cells between the cell walls; and
   the cells having first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side except for corner portions of the substantially square shape of the second cells, the second side and the extended line of the first side being substantially perpendicular,
   wherein the corner portions are any part where two sides of the second cells intersect.

2. The honeycomb filter according to claim 1, wherein a cell density of the honeycomb filter is 120/inch² or greater.

3. The honeycomb filter according to claim 1, wherein a thickness of the cell wall is 0.46 mm or less.

4. The honeycomb filter according to claim 1, wherein a thickness of the cell wall is 0.20 to 0.46 mm.

5. The honeycomb filter according to claim 1, wherein an average pore diameter of the honeycomb filter is 5 μm to 15 μm.

6. The honeycomb filter according to claim 1, wherein a porosity of the honeycomb filter is 30% to 50%.

7. The honeycomb filter according to claim 1, wherein an outer surface of each cell wall carries oxide catalyst comprising at least one of a platinum group element, other metal elements and oxides of these metal elements.

8. A method for producing a honeycomb filter, comprising:
   providing a ceramic raw material slurry;
   providing the ceramic raw material slurry into an extruder to obtain a molded honeycomb filter, the molded honeycomb filter comprising:
      cell walls extending along a longitudinal direction of the honeycomb filter to define cells between the cell walls; and
      the cells having first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side except for corner portions of the substantially square shape of the second cells, the second side and the extended line of the first side being substantially perpendicular,
      wherein the corner portions are any part where two sides of the second cells intersect; and
   sintering the molded honeycomb filter.

9. A method for producing a honeycomb filter, comprising:
   mixing ceramic particles and a binder to obtain a ceramic raw material slurry;
   providing the ceramic raw material slurry into an extruder to obtain a molded honeycomb filter, the molded honeycomb filter comprising:
      cell walls extending along a longitudinal direction of the molded honeycomb filter to define cells having a substantially square shape;
   drying the molded honeycomb filter using a microwave dryer;
   providing a sealing paste in at least one of the cells at one end face of the honeycomb filter to seal the at least one of the cells at the one end face;
   drying the sealing paste using a microwave dryer; and
   sintering the dried molded honeycomb filter,
   wherein the cells have first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side except for corner portions of the substantially square shape of the second cells, the second side and the extended line of the first side being substantially perpendicular, and wherein the corner portions are any part where two sides of the second cells intersect.

10. A honeycomb filter comprising:
   cell walls extending along a longitudinal direction of the honeycomb filter to define cells between the cell walls; and
   the cells having first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side of the substantially square shape of the second cells, the second side and the extended line of the first side being substantially perpendicular, the substantially square shape of the second cells having two additional sides that are substantially perpendicular to the second side, the extended line of the first side being substantially parallel to and offset from the two additional sides of the substantially square shape of the second cells.

11. The honeycomb filter according to claim 10, wherein a cell density of the honeycomb filter is 120/inch$^2$ or greater.

12. The honeycomb filter according to claim 10, wherein a thickness of the cell wall is 0.46 mm or less.

13. The honeycomb filter according to claim 10, wherein a thickness of the cell wall is 0.20 to 0.46 mm.

14. The honeycomb filter according to claim 10, wherein an average pore diameter of the honeycomb filter is 5 μm to 15 μm.

15. The honeycomb filter according to claim 10, wherein a porosity of the honeycomb filter is 30% to 50%.

16. The honeycomb filter according to claim 10, wherein an outer surface of each cell wall carries oxide catalyst comprising at least one of a platinum group element, other metal elements and oxides of these metal elements.

17. The honeycomb filter according to claim 10, wherein a cell density of the honeycomb filter is 120/inch$^2$ or greater.

18. The honeycomb filter according to claim 10, wherein a thickness of the cell wall is 0.20 to 0.46 mm.

19. The honeycomb filter according to claim 10, wherein an average pore diameter of the honeycomb filter is 5 μm to 15 μm.

20. The honeycomb filter according to claim 10, wherein a porosity of the honeycomb filter is 30% to 50%.

21. The honeycomb filter according to claim 10, wherein an outer surface of each cell wall carries oxide catalyst comprising at least one of a platinum group element, other metal elements and oxides of these metal elements.

22. A method for producing a honeycomb filter, comprising:
   providing a ceramic raw material slurry;
   providing the ceramic raw material slurry into an extruder to obtain a molded honeycomb filter, the molded honeycomb filter comprising:
      cell walls extending along a longitudinal direction of the honeycomb filter to define cells between the cell walls; and
      the cells having first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side of the substantially square shape of the second cells, the second side and the extended line of the first side being substantially perpendicular, the substantially square shape of the second cells having two additional sides that are substantially perpendicular to the second side, the extended line of the first side being substantially parallel to and offset from the two additional sides of the substantially square shape of the second cells; and
   sintering the molded honeycomb filter.

23. A method for producing a honeycomb filter, comprising:
   mixing ceramic particles and a binder to obtain a ceramic raw material slurry;
   providing the ceramic raw material slurry into an extruder to obtain a molded honeycomb filter, the molded honeycomb filter comprising:
      cell walls extending along a longitudinal direction of the molded honeycomb filter to define cells having a substantially square shape;
   drying the molded honeycomb filter using a microwave dryer;
   providing a sealing paste in at least one of the cells at one end face of the honeycomb filter to seal the at least one of the cells at the one end face;
   drying the sealing paste using a microwave dryer; and
   sintering the dried molded honeycomb filter,
   wherein the cells have first cells and second cells each having a substantially square shape in a cross-section perpendicular to the longitudinal direction, the first cells being sealed and the second cells being open at one end face of the honeycomb filter, the substantially square shape of the first cells including a first side whose extended line intersects a second side of the substantially square shape of the second cells, the second side and the extended line of the first side being substantially perpendicular, the substantially square shape of the second cells having two additional sides that are substantially perpendicular to the second side, the extended line of the first side being substantially parallel to and offset from the two additional sides of the substantially square shape of the second cells.

* * * * *